(12) United States Patent
Kimata et al.

(10) Patent No.: US 7,929,605 B2
(45) Date of Patent: Apr. 19, 2011

(54) IMAGE DECODING DEVICE, IMAGE DECODING METHOD, IMAGE DECODING PROGRAM, RECORDING MEDIUM RECORDING IMAGE DECODING PROGRAM

(75) Inventors: Hideaki Kimata, Kanagawa (JP); Masaki Kitahara, Kanagawa (JP); Kazuto Kamikura, Kanagawa (JP)

(73) Assignee: Nippon Telegraph and Telephone Corporation (JP)

( * ) Notice: Subject to any disclaimer, the term of this patent is extended or adjusted under 35 U.S.C. 154(b) by 1532 days.

(21) Appl. No.: 10/559,903

(22) PCT Filed: Jul. 22, 2004

(86) PCT No.: PCT/JP2004/010412
§ 371 (c)(1),
(2), (4) Date: Dec. 7, 2005

(87) PCT Pub. No.: WO2005/011285
PCT Pub. Date: Feb. 3, 2005

(65) Prior Publication Data
US 2007/0098068 A1     May 3, 2007

(30) Foreign Application Priority Data

Jul. 24, 2003     (JP) ............................. P2003-278828

(51) Int. Cl.
*H04B 1/66*     (2006.01)
*H04N 7/12*     (2006.01)
*H04N 11/02*    (2006.01)
*H04N 11/04*    (2006.01)

(52) U.S. Cl. .............................. 375/240.12; 375/240.14

(58) Field of Classification Search . 375/240.12–240.16
See application file for complete search history.

(56) References Cited

U.S. PATENT DOCUMENTS

2004/0013199 A1* 1/2004 Winger et al. ........... 375/240.16

FOREIGN PATENT DOCUMENTS

JP            11-164270 A     6/1999
(Continued)

OTHER PUBLICATIONS

Bernd Girod and Markus Flierl, "Multi-Frame Motion-Compensated Video Compression for the Digital Set-Top Box", 2002, IEEE ICIP 2002, vol. 2, p. II-1-II-4.

(Continued)

*Primary Examiner* — James A Thompson
(74) *Attorney, Agent, or Firm* — Kilpatrick Townsend & Stockton LLP

(57) ABSTRACT

In order to make it possible to obtain the correct decoded image even in the case of not decoding a particular frame of the encoded data and improve the coding efficiency, the predicted image production unit 103 selects the image data from the image data of a plurality of frames in the reference image memory 107 which are encoded in the past, of the i-th ($1 \leq i \leq j$) category, for the current frame which is classified as the j-th category by the image classifying unit 102, and produces the predicted image. The difference encoding unit 104 encodes a difference between the image data of the current frame and the predicted image. Also, the current category encoding unit 106 encodes the category number of the current frame, and the reference image specifying data encoding unit 105 encodes the reference image specifying data which specifies the image data selected from the reference image memory 107.

10 Claims, 19 Drawing Sheets

FOREIGN PATENT DOCUMENTS

| JP | 2000-041257 A | 2/2000 |
|----|---------------|--------|
| JP | 2001-258004 A | 9/2001 |
| JP | 2002-142227 A | 5/2002 |

OTHER PUBLICATIONS

Hideaki Kimata et al., "Jikan Scalable Fugoka eno Sansho Gazo Sentaku Yosoku Fugoka no Tekio Hoho" ("Reference Picture Selection Prediction for Temporal Scalability"), 2003 Nen Gazo Fugoka Symposium Shiryo (PCSJ2003), Nov. 12, 2003, pp. 55 to 56.

Gregory J. Conklin and Sheila S. Hemami, "A Comparison of Temporal Scalability Techniques", 1999, IEEE Transactions on Circuits and Systems for Video Technology, vol. 9, No. 6, pp. 909- to 919.

Jens-Rainer Ohm, "Three-Dimensional Subband Coding with Motion Compensation", 1994, IEEE Transactions on Image Processing, vol. 3, No. 5, pp. 559 to 571.

Thomas Wiegand, Xiaozheng Zhang, and Bernd Girod, "Long-Term Memory Motion-Compensated Prediction", IEEE Transactions on Circuits and Systems for Video Technology, vol. 9, No. 1, Feb. 1999, pp. 70 to 84.

Sung Cheol Park, Min Kyu Park, and Moon Gi Kang, "Super-Resolution Image Reconstruction: A technical Overview", IEEE Signal Processing Magazine, May 2003, pp. 21 to 36, 1053-5888/03.

C. Andrew Segall, Rafael Molina, and K. Katsaggelos, "High-Resolution Images from Low-Resolution Compressed Video", IEEE Signal Processing Magazine, May 2003, pp. 37 to 48, 1053-5888/03.

Wiegand, "Joint Final Committee Draft (JFCD) of Joint Video Specification (ITU-T Rec H, 264, ISO/IEC 14496-10 AVC)", Joint Video Team (JVT) of ISO, IEC MPEG and ITU-T VCEG 4th Meeting: Klagenfurt, Austria, Jul. 22-26, 2002, pp. 54-56, 112-113 [JVT-D157].

\* cited by examiner

FIG. 1
(A)
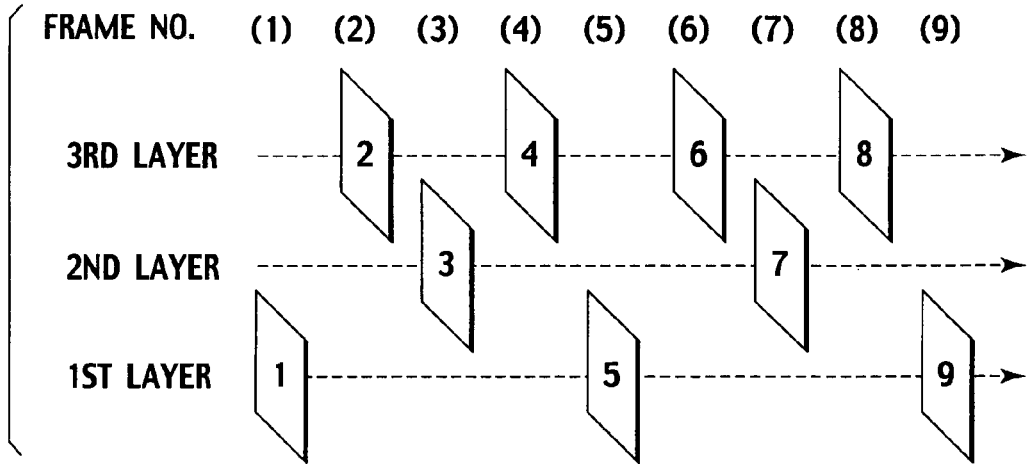
(B)
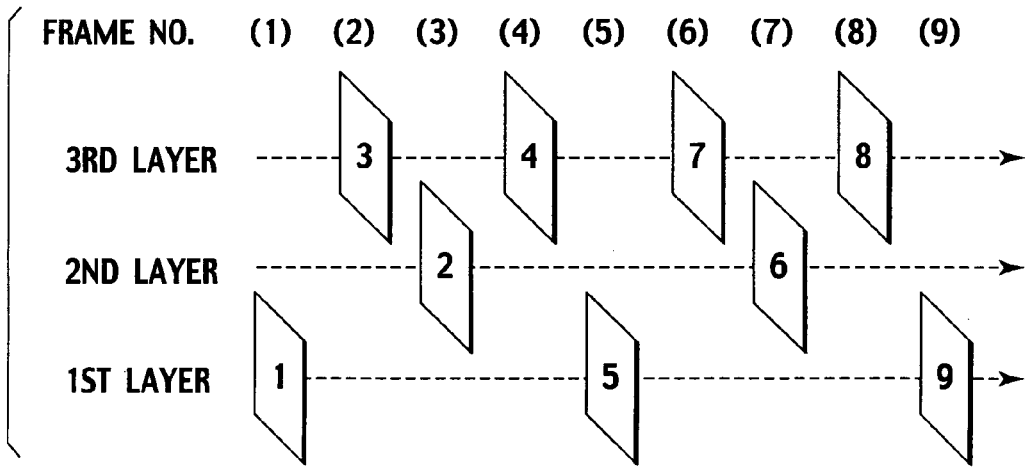
(C)
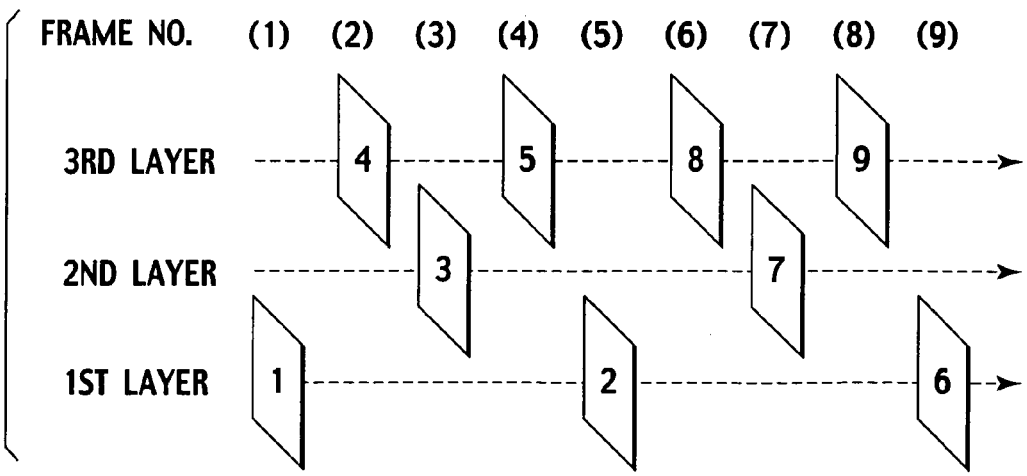

FIG. 2

| FRAME NUMBER | ORDER FOR NUMBERING REFERENCE IMAGE DATA AS (0, 1, 2, ⋯) |
|---|---|
| (2) | (3), (5), (1) |
| (3) | (5), (1) |
| (4) | (2), (3), (5), (1) |
| (5) | (1) |
| (6) | (7), (9), (4), (2), (3), (5), (1) |
| (7) | (9), (3), (5), (1) |
| (8) | (6), (7), (9), (4), (2), (3), (5), (1) |
| (9) | (5), (1) |

FIG. 3

| FRAME NUMBER | ORDER FOR NUMBERING REFERENCE IMAGE DATA AS (0, 1, 2, ⋯) |
|---|---|
| (2) | (3), (1), (5) |
| (3) | (5), (1) |
| (4) | (3), (5), (2), (1) |
| (5) | (1) |
| (6) | (7), (5), (4), (9), (3), (2), (1) |
| (7) | (9), (5), (3), (1) |
| (8) | (7), (9), (6), (5), (4), (3), (2), (1) |
| (9) | (5), (1) |

FIG. 16
(A) PREDICTION RELATIONSHIP OF IBBPBBP
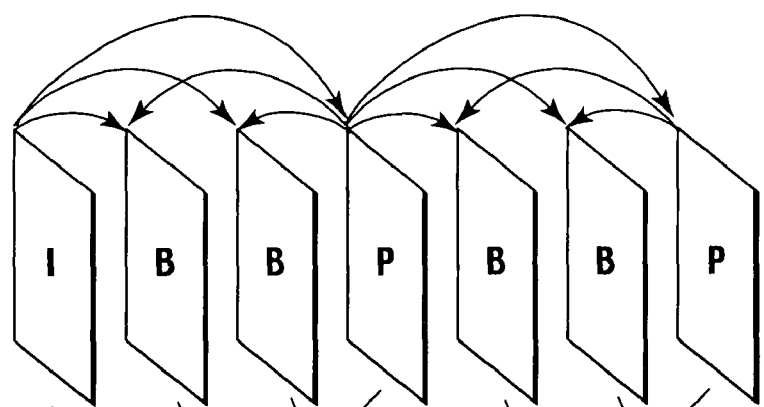
(B) ENCODING ORDER
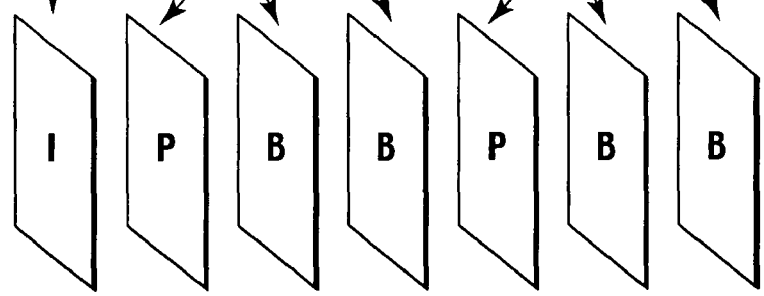

FIG. 17
(A) PREDICTION RELATIONSHIP OF IBBPBBP
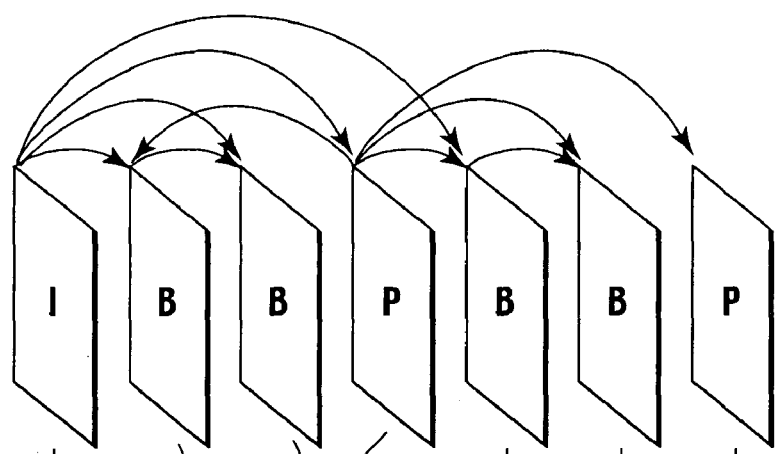
(B) ENCODING ORDER
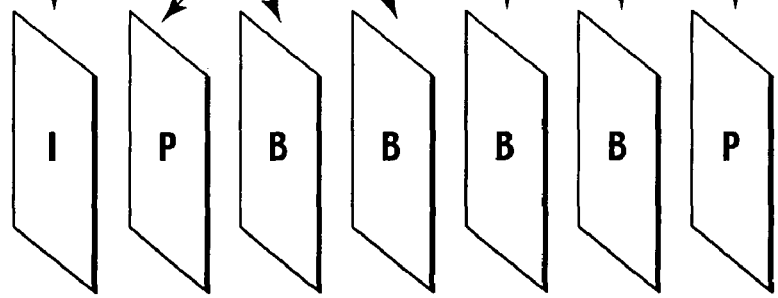

IMAGE DECODING DEVICE, IMAGE DECODING METHOD, IMAGE DECODING PROGRAM, RECORDING MEDIUM RECORDING IMAGE DECODING PROGRAM

TECHNICAL FIELD

The present invention relates to an image coding/decoding technique for a plurality of frames, using an inter-frame predictive coding scheme.

BACKGROUND ART

In the international standard video image coding such as MPEG-1, MPEG-2 and H.261, H263, the output time of each frame is encoded. This time information is called TR (Temporal Reference), which is encoded at fixed length for each frame. By setting in advance a time interval which becomes a reference in a system, and a time from a sequence top is indicated by a product of that time interval and TR. At the encoder, each frame is encoded by setting a time information of the input image as TR, and at the decoder, the decoded image of each frame is outputted at a time specified by TR.

On the other hand, in general, in the video image coding, the inter-frame predictive coding is used in order to realize a high coding efficiency by using a correlation in a time direction. The frame encoding modes include an I frame which is encoded without using a correlation between frames, a P frame which is predicted from an I frame encoded in the past, and a B frame which can be predicted from two frames encoded in the past.

In the B frame, there is a need to store the decoded images for two frames in a reference image memory. In particular, in the video coding scheme H.263 and H.264, the decoded image for a plurality of frames greater than or equal to two frames are stored in advance in the reference image memory, and the prediction can be made by selecting a reference image from that memory.

The reference image can be selected for each block, and a reference image specifying data for specifying the reference image is encoded. The reference image memory has one for short term (STRM) and one for long term (LTRM), where the decoded images of the current frames are sequentially stored into the STRM, while the images stored in the STRM are selected and stored into the LTRM. Note that the control method of the STRM and the LTRM is described in the non-patent reference 1, for example.

Non-patent reference 1: Thomas Wiegand, Xiaozheng Zhang, and Berned Girod, "Long-Term Memory Motion-Compensated Prediction", IEEE Transactions on Circuits and Systems for Video Technology, vol. 9, no. 1, pp.70-84, Feb., 1999.

In the B frame of MPEG-1, MPEG-2, a method for predicting from a frame of the further past is referred to as a forward inter-frame prediction, and a method for predicting from a frame of the further future is referred to as a backward inter-frame prediction. A display time of the reference frame in the backward inter-frame prediction is further in future than the current frame. In this case, after displaying the current frame, the reference frame of the backward inter-frame prediction will be outputted. In the case of predicting the B frame from two frames (bidirectional inter-frame prediction), one frame of the image data is produced by interpolating the image data from two frames, and this is set as the predicted image.

In FIG. 16(A), an example of the prediction relationship of the video images in the case where the display time of the reference frame in the backward inter-frame prediction is a future is shown. (1)-(7) shown in FIG. 16 indicates frame numbers. In the case of encoding with the encoding modes of the first frame to the seventh frame in an order of IBBPBBP, there is a prediction relationship shown in FIG. 16(A), so that in the case of actually encoding, the frames are encoded in the order of 1423756 as shown in FIG. 16(B). The order of TR encoded in this case takes values corresponding to 1423756 similarly as the encoded frames.

In the B frame of H.264, the concept of the backward inter-frame prediction is further expanded than MPEG-1, MPEG-2, and the display time of the reference frame in the backward inter-frame prediction may be further in past than the current frame. In this case, the reference frame of the backward inter-frame prediction will be outputted earlier.

As noted above, in H.264, a plurality of decoded images can be stored in the reference image memory. For this reason, a reference image specifying data L0 for the forward inter-frame prediction and a reference image specifying data L1 for the backward inter-frame prediction are defined, and each one of the reference image for the forward inter-frame prediction and the reference image for the backward inter-frame prediction is specified independently.

In order to specify the reference image for each block, the prediction mode (the forward inter-frame prediction, or the backward inter-frame prediction, or the bidirectional inter-frame prediction) of the block is encoded first, the reference image specifying data L0 is encoded in the case where the prediction mode is the forward inter-frame prediction, the reference image specifying data L1 is encoded in the case of the backward inter-frame prediction, and the reference image specifying data L0 and the reference image specifying data L1 are encoded in the case of the bidirectional inter-frame prediction.

By defining in this way, there is no need for the display time of the reference frame in the backward inter-frame prediction to be further in future than the current frame. In the B frame of H.264, the past frame can be specified as the reference image even in the backward inter-frame prediction in this way, and moreover the specification can be changed in block units, so that the prediction image similar to the P frame can be produced except for the case of the bidirectional inter-frame prediction.

In FIG. 17(A), an example of the prediction relationship of the video images in the case where the display time of the reference frame in the backward inter-frame prediction is a past is shown. Unlike the case of FIG. 16, even in the case of encoding with the encoding modes of the first frame to the seventh frame in an order of IBBPBBP, there is a prediction relationship shown in FIG. 17(A), so that the frames are encoded in the order of 1423567 as shown in FIG. 17(B).

In the method for inter-frame coding by selecting the reference image by storing a plurality of decoded images in the reference image memory in advance, there is no need to store the decoded images of all frames. By utilizing this, it is possible to realize the time scalable function.

For example, in the case where there is a prediction relationship such as FIG. 16(A) in MPEG-1, MPEG-2, the B frames (frame numbers (2), (3), (5), (6)) will not be used as the reference image at the subsequent frames. For this reason, the decoding side can decode only I frames and P frames and does not decode B frames. Assuming that they are originally encoded at 30 frames per second, it is possible to output video of 10 frames per second by making it not to decode/output B frames.

Such a technique can also be applied to the multiple layers. FIG. 1 is a figure showing an example of the prediction relationship in the three layer configuration. In FIG. 1, (1)-(9) indicates frame numbers, and numerals 1-9 described inside frames indicate the encoding order of each frame.

For example, as shown in FIG. 1(C), in the case where the fifth frame (first layer) uses the first frame as the reference frame, the third frame (second layer) uses the first frame or the fifth frame as the reference frame, the second frame (third layer) uses the first frame or the third frame as the reference frame, and the fourth frame (third layer) uses the third frame and the fifth frame as the reference frames, and in the case where all five frames are the video of 30 frames per second, it is possible to output video of 15 frames per second by not decoding the second frame and the fourth frame (third layer).

Also, by not decoding the second frame, the third frame and the fourth frame (second layer and third layer), it is possible to output video of 7.5 frames per second. Note that, besides FIG. 1(C), the frame encoding order can be set in a plurality of patterns, and it may be made the same as the input order as in FIG. 1(A), and it may be made such that the second layer is encoded immediately after encoding the first layer and then the third layer is encoded as in FIG. 1(B), for example.

In the case where there are frames which will not be set as the reference frame in this way, the mechanism for changing the time resolution may be executed by the decoding side, or may be executed at a relay point between the encoding side and the decoding side. In the case of delivering the encoded data in unidirection as in the broadcasting, it is preferable to execute it by the decoding side.

Also, such a time scalable function can be applied to the coding of the multiple viewpoint video by regarding layers of FIG. 1 as viewpoints.

Also, even a plurality of frames in general in which there is no time relationship among frames can be handled as the video image by arranging the plurality of frames on dimensions set up in advance and regarding that dimension as time. It is also possible to apply the time scalable function by classifying such a plurality of frames into a smaller number of sets, and regarding them as layers in FIG. 1.

Also, as a method for realizing the time scalable coding, there is the MCTF coding. This MCTF coding method is a method in which the filtering (sub-band division) is applied in time direction with respect to the video data, and the energy of the video data is compactified by utilizing a correlation in time direction of the video data. FIG. 18 shows a conceptual diagram for dividing the lower band in octaves in time direction. GOP is set up and the filtering is applied in time direction within GOP. For the filter in time direction, the Haar basis is proposed in general (see non-patent reference 2).

Non-patent reference 2: Jens-Rainer Ohm, "Three-Dimensional Subband Coding with Motion Compensation", IEEE Trans. Image Proc., vol. 3, no. 5, pp. 559-571, 1994.

Also, in general, the Lifting Scheme as shown in FIG. 19 can be applied to the Haar basis. By this scheme, the filtering can be made with less calculation amount. In this Lifting Scheme, predict is the processing similar to the ordinary predicting coding, which is the processing for obtaining a remaining difference between the predicted image and the original image.

Note that the methods for obtaining the image in high resolution from a plurality of images are described in non-patent reference 3 and non-patent reference 4.

Non-patent reference 3: Sung Cheol Park, Min Kyu Part, and Moon Gi Kang, "Super-Resolution Image Reconstruction: A Technical Overview", IEEE Signal Processing Magazine, pp.21-36, May, 2003.

Non-patent reference 4: C. Andrew Segall, Rafael Molina, and Aggelos K. Katsaggelos, "High-Resolution Image from Low-Resolution Compress Video", IEEE Signal Processing Magazine, pp. 37-48, May, 2003.

In the case of being equipped with the reference image memory for a plurality of frames, the coding efficiency improves when the maximum number of frames to be stored is made larger. Here, in the case of realizing the time scalable function, even in the case where the number of layers to be decoded becomes less, there is a need to specify the identical decoded image by the reference image specifying data in the encoded data.

However, in the conventional H.264, even though the STRM and the LTRM are equipped, the LTRM is a memory for storing images stored in the STRM and the decoded images are stored into the STRM, so that the reference image specifying data is encoded with respect to the decoded image regardless of layers in the time scalable function.

Consequently, in the case of not decoding a particular frame of the encoded data at the decoding side, frames with different reference image specifying data will be referred. When the predicted image is produced from different reference images in this way, the correct decoded image cannot be obtained at the decoding side.

In the case of not storing the decoded images in the reference image memory and limiting the reference images to the preceding or following I frame or P frame as in the B frame of MPEG-1, MPEG-2, rather than selecting the reference image from a plurality of frames by using the reference image specifying data, there is no case in which the reference images are different in the case of not decoding the B frame. By this the time scalable coding can be realized. However, if the decoded image of the B frame is not stored in the reference image memory, the B frame has the reference image limited to the preceding or following I frame or P frame and it is not equipped with the reference image memory for a plurality of frames, so that the coding efficiency cannot be improved.

As described above, in the conventional method for realizing the time scalable coding, it cannot be equipped with the reference image memory for a plurality of frames in order to improve the coding efficiency, and conversely, in the conventional method for storing a plurality of frames into the reference image memory, the time scalable coding cannot be realized.

DISCLOSURE OF THE INVENTION

The present invention has an object to provide an image encoding device, an image decoding device, an image encoding method, an image decoding method, an image encoding program, an image decoding program, and their recording media, capable of obtaining the correct decoded image and improving the coding efficiency, even in the case of not decoding a particular frame of the encoded data at the decoding side as the reference image identical to the case of decoding that frame is specified.

The first aspect of the present invention is an image encoding method for encoding a plurality of image data in which a predicted image is produced by selecting an image data from image data of a plurality of frames which are encoded in past, characterized by executing an image classifying step for classifying each frame into N sets of categories, a predicted image producing step for producing a predicted image by selecting an image data from image data of a plurality of frames of an i-th (i is from 1 to j) category which are encoded in past, for a current frame which is classified as a j-th category, a difference encoding step for encoding a difference between the image data of the current frame and the predicted image, a reference image specifying data encoding step for encoding a reference image specifying data for the j-th category, which specifies the image data selected at the predicted image producing step, and a current category encoding step for encoding a category number of the current frame.

The second aspect of the present invention is, in the image encoding method according to the first aspect of the present invention, characterized in that a frame number for specifying a frame belonging to a category is assigned for each category, and the reference image specifying data is formed by a category number to which the image data selected at the predicted image producing step belongs and a frame number of a category specified by that number.

The third aspect of the present invention is an image decoding method for decoding a plurality of image data in which a predicted image is produced by selecting an image data from image data of a plurality of frames which are decoded in past, characterized by executing a current category decoding step for decoding a category number of a current frame, a reference image specifying data decoding step for decoding a reference image specifying data which specifies an image data, for the category number obtained by the current category decoding step, a predicted image producing step for producing a predicted image from an image data specified by the reference image specifying data, a difference decoding step for decoding a difference between a decoded image of the current frame and the predicted image, a decoded image producing step for producing the decoded image from the difference data and the predicted image, and a decoded image storing step for storing the decoded image of the current frame into a memory for the category number obtained by the current category decoding step.

The fourth aspect of the present invention is, in the image decoding method according to the third aspect of the present invention, characterized in that a frame number for specifying a frame belonging to a category is assigned for each category, and the reference image specifying data is formed by a category number to which the image data selected by the predicted image producing step belongs and a frame number of a category specified by that number.

According to the image encoding method according to the first aspect of the present invention or the image decoding method according to the third aspect of the present invention, it is possible to manage the reference image for each category by classifying the reference image memory into a plurality of categories in advance. By this, in the case where whether or not to decode is determined for each category and there is a category which is not to be decoded, it is possible to produce the predicted image from the reference images contained in the other categories. As the reference image specifying data is set separately for each category, the identical image is specified by the reference image specifying data in the case of decoding the category and in the case of not decoding, so that it is possible to obtain the correct decoded image. Also, the number of reference images for each category can be made larger so that it is possible to improve the coding efficiency.

The categories can be set to layers shown in FIG. 1, for example. The image of the first category (first layer) refers only to the image of the first category (first layer), the image of the second category (second layer) refers to the images of the first category (first layer) and the second category (second layer), and the image of the third category (third layer) refers to the images of the first category (first layer), the second category (second layer), and the third category (third layer). At this point, when it is equipped with the reference image memory capable of storing the reference images for a plurality of frames for each category, it is possible to improve the coding efficiency of each category.

As the reference image specifying data, it is possible to use, for example, (method 1) one in which a serial number is attached from a frame for which the encoding or decoding order is closer to the current frame, with respect to frames contained in the category which is to be set as the reference image, and (method 2) one in which a serial number is attached from a frame for which the input or output order is closer to the current frame, with respect to frames contained in the category which is to be set as the reference image.

Without being limited to these, it suffices to be the specifying method in which the reference image can be specified uniquely by the encoding side and the decoding side, and the image to be referred coincides in the case of not decoding frames of the category which is not to be set as the reference image.

For the frame configuration with the encoding order as in FIG. 1(C), an example of the reference image specifying data in the case of specifying by the method 1 is shown in FIG. 2, and an example of the reference image specifying data in the case of specifying by the method 2 is shown in FIG. 3. Note however that in FIG. 3, in the case where the difference of the input or output order with respect to the current frame is the same, a smaller number is assigned to a frame which is encoded more recently. Also, as the reference image specifying data, it is assumed as serial numbers such as 0, 1, 2, . . . for example.

In FIG. 2, in the case where the current frame is the second frame, for example, the order for attaching the reference image specifying data is an order of the third frame, the fifth frame, the first frame, and in the case where the current frame is the third frame, the order for attaching the reference image specifying data is an order of the fifth frame, the first frame.

In FIG. 3, in the case where the current frame is the second frame, for example, the order for attaching the reference image specifying data is an order of the third frame, the first frame, the fifth frame, and in the case where the current frame is the third frame, the order for attaching the reference image specifying data is an order of the fifth frame, the first frame.

Also, the present invention may use either one of the reversible coding and the irreversible coding. In the reference image memory of the image encoding device, either one of the original image and the decoded image may be stored in the case of the reversible coding. The decoded image will be stored in the case of the irreversible coding.

According to the image encoding method according to the second aspect of the present invention or the image decoding method according to the fourth aspect of the present invention, for the reference image specifying data, it is possible to use a configuration of (method 3) a category number and a frame number within the category which is set within the category besides the above noted examples (method 1 and method 2).

Here, the category number may be an absolute number attached sequentially from the first category, or a difference from the category number of the current frame. The frame number may be an absolute number attached sequentially from the first frame, or a difference from the current frame.

According to the method 3, the frame numbers are assigned individually for each category, so that the management of the frame numbers is simple, and it is possible to reduce the non-coincidence of the reference image in the case where the frame of a particular category cannot be decoded due to the transmission error.

For example, in FIG. 1(C), in the case where the second frame (the first frame within the third category) cannot be decoded due to the transmission error, the decoded image of the second frame cannot be obtained, and the error will be propagated to frames which refer to the second frame.

In the case where the frame number within the category is set to be the absolute number from the first frame and the second frame within the third category shown in FIG. 1(C) does not refer to the first frame within the third category, it is possible to decode correctly from the second frame within the third category. Consequently, if the second or subsequent frame within the third category refers to the frames other than the first frame within the third category, that frame can be decoded correctly.

Also, in the case where the frame number within the category is set to be the relative number from the current frame, all the frame numbers of the frames of the second category will be displaced. However, if the second frame or the subsequent frame does not refer to the frame of the second category, the frames of the other categories can be decoded correctly.

Also, by assigning the tentative frame numbers to frames belonging to the current category number and below, it is possible to assign a unique number only to the frames that can be selected at the predicted image step. Also, the numbers are not assigned to those frames that cannot be selected at the predicted image step. Consequently, even in the case of not decoding the frames for which the category number is greater than the current frame at the image decoding side, it is possible to specify the reference image correctly, so that it becomes possible to obtain the correct decoded image.

Also, by using the encoding order of the frames encoded in the past, it is possible to set the tentative frame numbers such that the code amount of the reference image specifying data becomes less for the frame which is encoded more recently. By this, it is possible to reduce the code amount of the reference image specifying data, and it is possible to improve the coding efficiency.

According to the image encoding method according to the fifth aspect of the present invention or the image decoding method according to the sixth aspect of the present invention, it is possible to change the correspondence between the reference image and the reference image specifying data in frame or slice units. By changing it such that the code amount of the reference image specifying data is reduced, it is possible to improve the overall coding efficiency.

According to the image encoding method according to the seventh aspect of the present invention or the image decoding method according to the eighth aspect of the present invention, it is possible to increase candidates for the image data to be referred at a time of encoding the current frame in the MCTF coding scheme, so that it is possible to improve the coding efficiency.

Note that, in the present invention, the reference image memory of each category may be configured by physically different memory, or by distinguishing it logically. Also, the allocation of the reference image memory amount for each category may be changed for each frame or a plurality of frames.

Also, the number of pixels within frame may be set differently for each category. For example, the number of pixels for the second layer or the third layer in FIG. 1 may be set to be a half or twice vertically and horizontally of the first layer. In this case, at a time of producing the predicted image at the predicted image production unit, the enlargement or contraction by the Affine transformation, etc., and the high resolution conversion will become necessary.

For the high resolution conversion, methods for obtaining a high resolution image from a plurality of images are reported, and it is suitable to utilize these methods (see non-patent reference 3 or non-patent reference 4, for example). Also, the gradation (number of bits) of a pixel may be set differently for each category. For example, the gradation of the first layer may be set to be 8 bits and the gradation of the second layer and the third layer may be set to be 4 bits in FIG. 1. In this case, at a time of producing the predicted image at the predicted image production unit, the increase or decrease of the gradation will become necessary.

The present invention is targeting the image formed by a plurality of frames. A plurality of frames may constitute a video image, or a multiple viewpoint image obtained by projecting while changing viewpoints.

According to the present invention, at a time of encoding or decoding the image of a plurality of frames, by classifying the reference image memory into a plurality of categories, and managing the reference images for each category, the identical reference image is specified in the case of decoding the category and the case of not decoding, so that the correct decoded image can be obtained. Also, the number of reference images for each category can be made larger so that the coding efficiency can be improved.

BRIEF DESCRIPTION OF THE DRAWINGS

FIG. 1 is a figure showing an example of the prediction relationship of a layer configuration.

FIG. 2 is a figure showing an example of a reference image specifying data.

FIG. 3 is a figure showing an example of a reference image specifying data.

FIG. 16 is a figure showing an example of the prediction relationship of video images.

FIG. 17 is a figure showing an example of the prediction relationship of video images.

BEST MODE FOR CARRYING OUT THE INVENTION

The embodiment of the present invention will be described by using drawings. In the present embodiment, it is assumed that the image is classified into three categories, and the image is irreversible coded. The input image of the first category uses the decoded image of the first category as the reference image candidate, the input image of the second category uses the decoded images of the first category and the second category as the reference image candidates, and the input image of the third category uses the decoded images of the first category, the second category and the third category as the reference image candidates.

As the embodiment of the present invention, an exemplary case of encoding the image is shown FIG. 1. Also, an example in which one frame is divided into macro-blocks of 16 pixels vertically and horizontally, and the encoding is done by selecting the reference image such that the code amount of the difference encoded data for each macro-block becomes minimum is shown.

Figure 4:
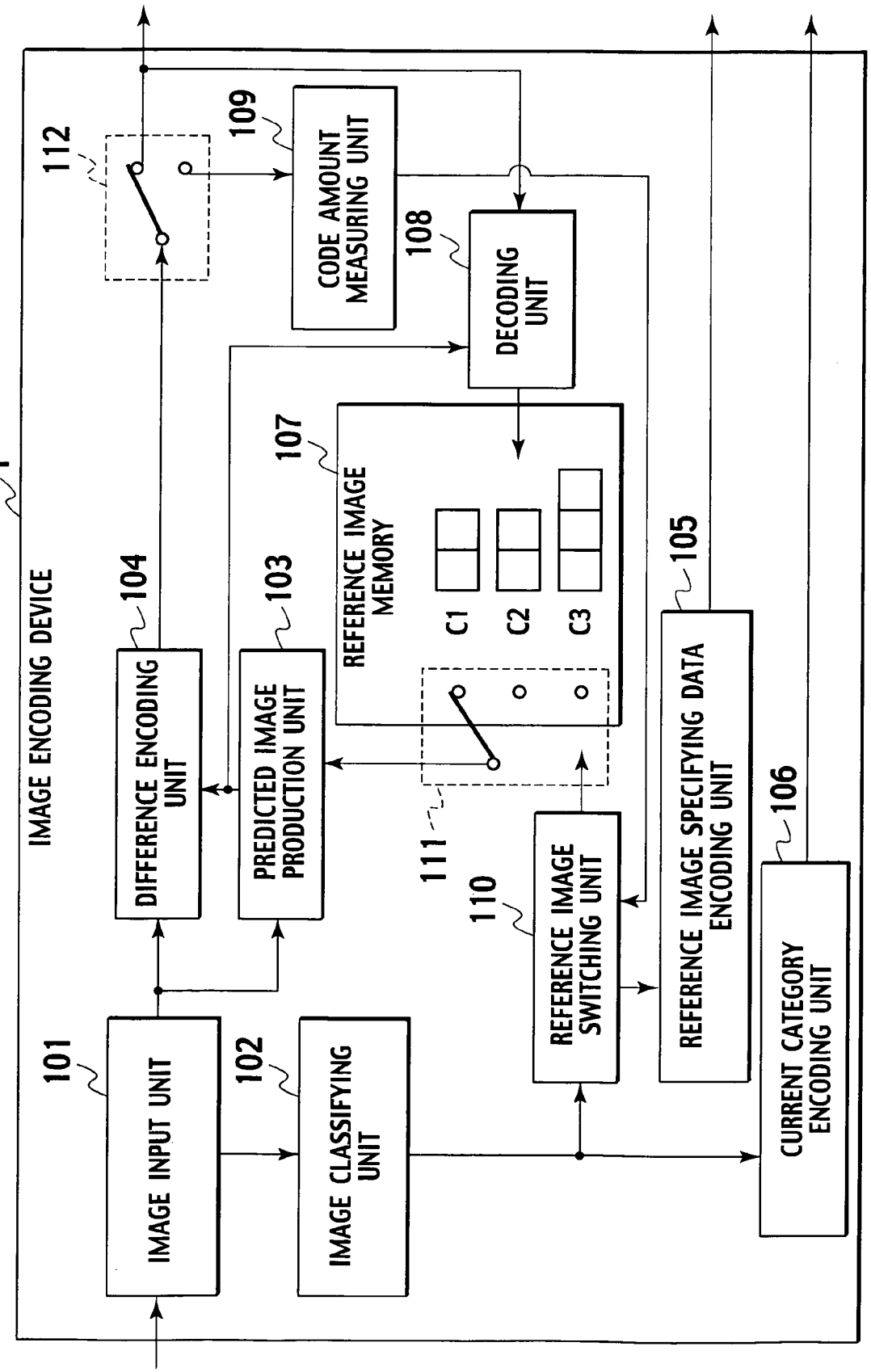
FIG. 4 is a figure showing a first exemplary configuration of an image encoding device.

FIG. 4 is a figure showing a configuration of the image encoding device according to the embodiment of the present invention. The image encoding device 1 has an image input unit 101 for inputting image data, an image classifying unit 102 for classifying the input image into three categories, a predicted image production unit 103 for producing a predicted image, a difference encoding unit 104 for encoding a difference between the input image and the predicted image, a reference image specifying data encoding unit 105 for encoding a reference image specifying data, a current category encoding unit 106 for encoding a category number of a current frame, a reference image memory 107 for storing a decoded image, a decoding unit 108 for producing a decoded image by decoding a difference encoded data produced by the difference encoding unit 104, a code amount measuring unit 109 for measuring a code amount of a difference encoded data produced by the difference encoding unit 104, a reference image switching unit 110 for controlling a switching of reference images to be used at the predicted image production unit 103, a switch unit 111 for switching reference images according to a control of the reference image switching unit 110, and a switch unit 112 for switching an output of a difference encoded data and a measurement of a code amount.

It is assumed that, at the reference image specifying data encoding unit 105, the reference image specifying data attached according to the method 1 described above, as shown in FIG. 2 for example, will be encoded.

It is assumed that the reference image memory 107 has memories capable of storing images of 7 frames, and memories (C1) for two frames are allocated to the first category, memories (C2) for two frames are allocated to the second category, and memories (C3) for three frames are allocated to the third category.

It is assumed that, in the case where images are stored in all memories at a time of newly storing a decoded image at each category, the decoded image will be stored by discarding the image stored in the oldest past. It is assumed that the image input unit 101 inputs input images in an order indicated by a numeral described within each frame of FIG. 1(C), and divides the input image into macro-blocks.

It is assumed that the image classifying unit 102 classifies each frame into categories (first layer, second layer, third layer) shown in FIG. 1. It is assumed that the current category encoding unit 106 encodes the category number of the current frame at fixed length. It is assumed that, at the predicted image production unit 103, a motion search is carried out between the input image and the reference image, and an image at a location for which a difference is the smallest is set as the predicted image.

It is assumed that a motion vector data is encoded as a part of a difference encoded data by the difference encoding unit 104. Also, it is assumed that the first frame is already encoded and the decoded image is already stored in the reference image memory 107.

Under these assumptions, the input image is encoded as follows. First, the image input unit 101 takes in the fifth frame in FIG. 1(C), and divide it into macro-blocks. The image classifying unit 102 classifies the input image into the first category. The current category encoding unit 106 encodes the fact that it is the first category.

The reference image switching unit 110 sets the reference image to the first frame of the first category. The predicted image production unit 103 produces the predicted image from the reference image. The difference encoding unit 104 produces the difference encoded data for each macro-block. In this frame, the candidate for the reference image is the first frame, so that the code amount measuring unit 109 does not measure the code amount, and the difference encoded data is outputted from the switch unit 112. Also, the decoding unit 108 decodes the difference encoded data.

The reference image specifying data encoding unit 105 encodes the reference image specifying data. After encoding all the macro-blocks, the decoded image is stored into the memory (C1) for the first category of the reference image memory 107. In the reference image memory 107 after encoding the fifth frame, the decoded images of the first frame and the fifth frame are stored in the memory (C1) for the first category.

Next, the image input unit 101 takes in the third frame in FIG. 1(C), and divides it into macro-blocks. The image classifying unit 102 classifies the input image into the second category. The current category encoding unit 106 encodes the fact that it is the second category.

Then, each macro-block is encoded as follows. First, the reference image switching unit 110 sets the reference image to the first frame of the first category. The predicted image production unit 103 produces the predicted image from the reference image. The difference encoding unit 104 produces the difference encoded data. The code amount measuring unit 109 measures the code amount of the difference encoded data.

Next, the reference image switching unit 110 sets the reference image to the second frame of the first category. The difference encoding unit 104 produces the difference encoded data. The code amount measuring unit 104 measures the code amount of the difference encoded data.

Then, the reference image switching unit 110 sets a frame in the case of the smallest value among the code amounts obtained by the code amount measuring unit 109 as the reference image. The predicted image production unit 103 produces the predicted image from the reference image. The difference encoding unit 104 produces and outputs the difference encoded data. The decoding unit 108 decodes the difference encoded data. The reference image specifying data encoding unit 105 encodes the reference image specifying data.

Such a processing is executed for all the macro-blocks. After encoding all the macro-blocks, the decoded images are stored into the memory (C2) for the second category of the reference image memory 107. In the reference image memory 107 after encoding the third frame, the decoded images of the first frame and the fifth frame are stored in the memory (C1) for the first category, and the decoded image of the third frame is stored in the memory (C2) for the second category.

Next, the image input unit 101 takes in the second frame in FIG. 1(C), and divides it into macro-blocks. The image classifying unit 102 classifies the input image into the third category. The current category encoding unit 106 encodes the fact that it is the third category.

Then, each macro-block is encoded as follows. First, the reference image switching unit 110 sets the reference image to the first frame of the first category. The predicted image production unit 103 produces the predicted image from the reference image. The difference encoding unit 104 produces the difference encoded data. The code amount measuring unit 109 measures the code amount of the difference encoded data.

Such a processing is executed for all the reference image candidates. The reference image candidates are the images (first frame, fifth frame, third frame) stored in the memory (C1) for the first category or the memory (C2) for the second category of the reference image memory 107.

Then, the reference image switching unit 110 sets a frame in the case of the smallest value among the code amounts obtained by the code amount measuring unit 109 as the reference image. The predicted image production unit 103 produces the predicted image from the reference image. The difference encoding unit 104 produces and outputs the difference encoded data. The decoding unit 108 decodes the difference encoded data. The reference image specifying data encoding unit 105 encodes the reference image specifying data.

Such a processing is executed for all the macro-blocks. After encoding all the macro-blocks, the decoded images are stored into the memory (C3) for the third category of the reference image memory 107. In the reference image memory 107 after encoding the second frame, the decoded images of the first frame and the fifth frame are stored in the memory (C1) for the first category, the decoded image of the third frame is stored in the memory (C2) for the second category, and the decoded image of the second frame is stored in the memory (C3) for the third category.

Next, for the fourth frame, similarly as the second frame, it is classified into the third category, the difference encoded data are obtained while switching the reference image for each macro-block, the reference image is determined such that the code amount becomes smallest, and the decoded image is produced.

The reference image candidates are the images (first frame, fifth frame, third frame, second frame) stored in the memory (C1 or C2 or C3) for the first category or the second category or the third category of the reference image memory 107.

After encoding all the macro-blocks, the decoded images are stored into the memory (C3) for the third category of the reference image memory 107. In the reference image memory 107 after encoding the fourth frame, the decoded images of the first frame and the fifth frame are stored in the memory (C1) for the first category, the decoded image of the third frame is stored in the memory (C2) for the second category, and the decoded images of the second frame and the fourth frame are stored in the memory (C3) for the third category.

Next, for the ninth frame, similarly as the fifth frame, it is classified into the first category, the difference encoded data are obtained while switching the reference image for each macro-block, the reference image is determined such that the code amount becomes smallest, and the decoded image is produced. The reference image candidates are the images (first frame, fifth frame) stored in the memory for the first category of the reference image memory 107.

After encoding all the macro-blocks, the decoded images are stored into the memory (C1) for the first category of the reference image memory 107. At this point, only two frames can be stored into the memory (C1) for the first category so that the decoded image of the ninth frame is stored after discarding the image of the first frame which was stored in the oldest past.

In the reference image memory 107 after encoding the ninth frame, the decoded images of the fifth frame and the ninth frame are stored in the memory (C1) for the first category, the decoded image of the third frame is stored in the memory (C2) for the second category, and the decoded images of the second frame and the fourth frame are stored in the memory (C3) for the third category.

Next, for the seventh frame, similarly as the third frame, it is classified into the second category, the difference encoded data are obtained while switching the reference image for each macro-block, the reference image is determined such that the code amount becomes smallest, and the decoded image is produced. The reference image candidates are the images (fifth frame, ninth frame, third frame) stored in the memory (C1 or C2) for the first category or the second category of the reference image memory 107.

After encoding all the macro-blocks, the decoded images are stored into the memory (C2) for the second category of the reference image memory 107. In the reference image memory 107 after encoding the seventh frame, the decoded images of the fifth frame and the ninth frame are stored in the memory (C1) for the first category, the decoded images of the third frame and the seventh frame are stored in the memory (C2) for the second category, and the decoded images of the second frame and the fourth frame are stored in the memory (C3) for the third category.

Next, for the sixth frame, similarly as the second frame, it is classified into the third category, the difference encoded data are obtained while switching the reference image for each macro-block, the reference image is determined such that the code amount becomes smallest, and the decoded image is produced.

The reference image candidates are the images (fifth frame, ninth frame, third frame, seventh frame, second frame, fourth frame) stored in the memory (C1 or C2) for the first category or the second category or the memory (C3) for the third category of the reference image memory 107.

After encoding all the macro-blocks, the decoded images are stored into the memory (C3) for the third category of the reference image memory 107. In the reference image memory 107 after encoding the sixth frame, the decoded images of the fifth frame and the ninth frame are stored in the memory (C1) for the first category, the decoded images of the third frame and the seventh frame are stored in the memory (C2) for the second category, and the decoded images of the second frame, the fourth frame and the sixth frame are stored in the memory (C3) for the third category.

Next, for the eighth frame, similarly as the second frame, it is classified into the third category, the difference encoded data are obtained while switching the reference image for each macro-block, the reference image is determined such that the code amount becomes smallest, and the decoded image is produced.

The reference image candidates are the images (fifth frame, ninth frame, third frame, seventh frame, second frame, fourth frame, sixth frame) stored in the memory (C1 or C2 or C3) for the first category or the second category or the third category of the reference image memory 107.

After encoding all the macro-blocks, the decoded images are stored into the memory (C3) for the third category of the reference image memory 107. At this point, only three frames can be stored into the memory (C3) for the third category so that the decoded image of the eighth frame is stored after discarding the image of the second frame which was stored in the oldest past.

In the reference image memory 107 after encoding the eighth frame, the decoded images of the fifth frame and the ninth frame are stored in the memory (C1) for the first category, the decoded images of the third frame and the seventh frame are stored in the memory (C2) for the second category, and the decoded images of the fourth frame, the sixth frame and the eighth frame are stored in the memory (C3) for the third category. By the above, the encoding from the first frame to the ninth frame is carried out.

Figure 5:
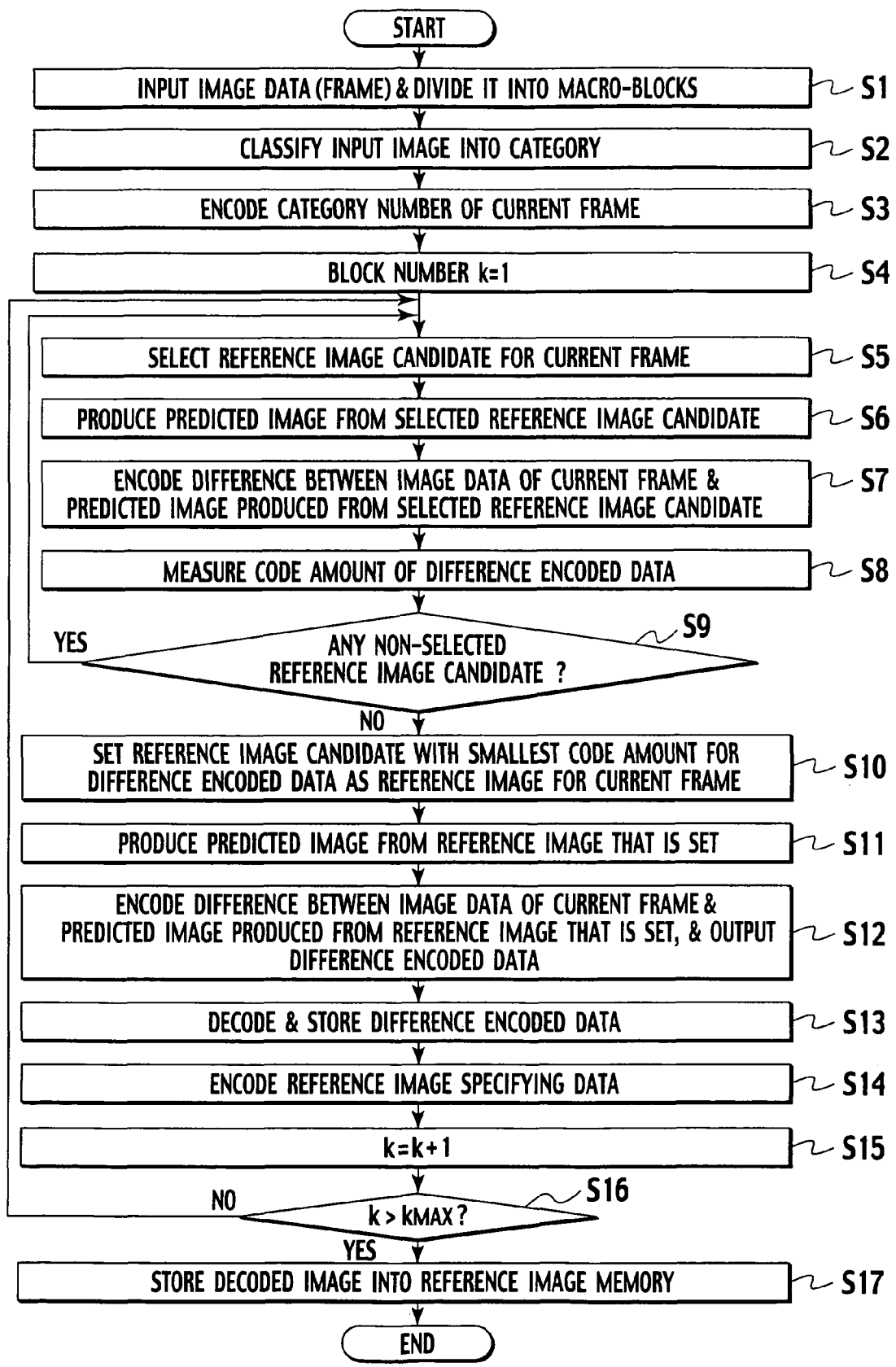
FIG. 5 is a figure showing one example of an image encoding processing flow.

FIG. 5 is a figure showing one example of the image encoding processing flow in the embodiment of the present invention. First, the image data (frame) is inputted, and divided into macro-blocks (step S1). It is assumed that the block number k (k=1, 2, 3 . . . ) for example, is attached to the divided macro-block.

Next, the input image is classified into categories (step S2). The category number of the current frame is encoded (step S3). The first macro-block (block number k=1) is taken out (step S4), the reference image candidate for the current frame is selected (step S5), and the predicted image is produced from the selected reference image candidate (step S6).

A difference between the image data of the current frame and the predicted image produced from the selected reference image candidate is encoded (step S7). Then, the code amount of the difference encoded data is measured (step S8).

Whether there is any non-selected reference image candidate or not is judged (step S9), and if there is a non-selected reference image candidate, it returns to the step S5, and if there is no non-selected reference image candidate, the reference image candidate for which the code amount of the difference encoded data is the smallest is set as the reference image for the current frame (step S10).

The predicted image is produced from the set reference image (step S11), a difference between the image data of the current frame and the predicted image produced from the set reference image is encoded, and the difference encoded data is outputted (step S12). The difference encoded data is decoded and stored (step S13). Also, the reference image specifying data is encoded (step S14).

Next, the block number k is incremented (step S15), and whether the difference encoded data are produced for all the macro-blocks (k>kMAX) or not is judged (step S16). In the case where there is a macro-block for which the difference encoded data is not produced, it returns to the step S5. In the case where the difference encoded data are produced for all the macro-blocks, the decoded image is stored into the reference image memory 107 (step S17), and the processing is finished.

Figure 6:
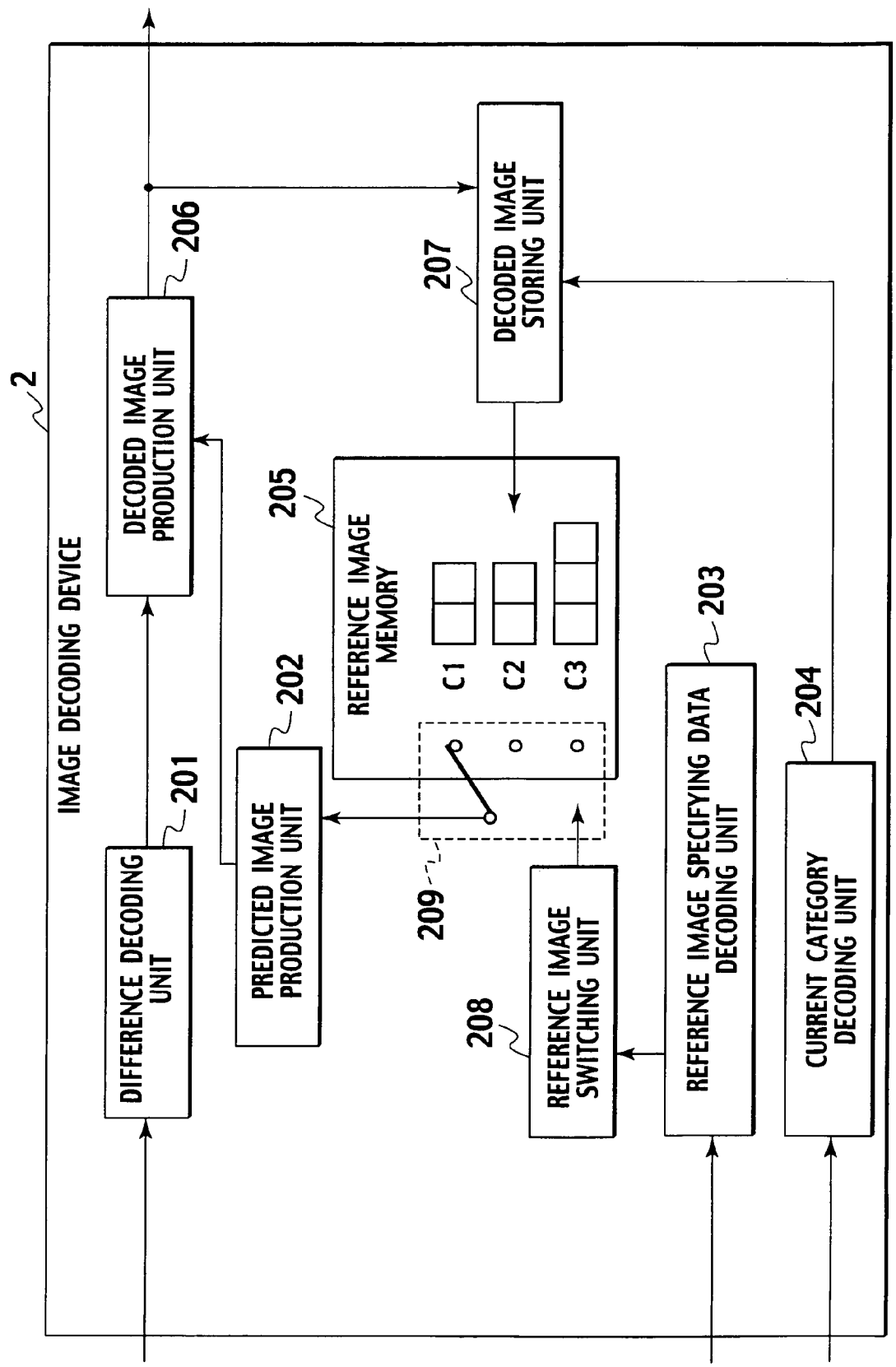
FIG. 6 is a figure showing a first exemplary configuration of an image decoding device.

FIG. 6 is a figure showing a configuration of the image decoding device according to the embodiment of the present invention. The image decoding device 2 has a difference decoding unit 201 for decoding the difference encoded data, a predicted image production unit 202 for producing the predicted image, a reference image specifying data decoding unit 203 for decoding the reference image specifying data, a current category decoding unit 204 for decoding the category number of the current frame, a reference image memory 205 for storing the reference image, a decoded image production unit 206 for producing the decoded image from the difference image and the predicted image, a decoded image storing unit 207 for storing the decoded image into the reference image memory 205, a reference image switching unit 208 for controlling a switching of the reference image to be used at the predicted image production unit 202, and a switch unit 209 for switching the reference image according to the control of the reference image switching unit 208.

It is assumed that, at the reference image specifying data decoding unit 203, the reference image specifying data will be decoded according to the method 1, as shown in FIG. 2 for example. It is assumed that the reference image memory 205 has memories capable of storing images of 7 frames, and memories (C1) for two frames are allocated to the first category, memories (C2) for two frames are allocated to the second category, and memories (C3) for three frames are allocated to the third category.

It is assumed that, in the case where images are stored in all memories at a time of newly storing a decoded image at each category, the decoded image will be stored by discarding the image stored in the oldest past. It is assumed that the current category decoding unit 204 decodes a fixed length of the category number of the current frame. Also, it is assumed that the first frame is already decoded and the decoded image is already stored in the reference image memory 205.

In the following, the decoding processing of the encoded data encoded by said image encoding device 1 will be described concretely. For the fifth frame of FIG. 1(C), the current category decoding unit 204 decodes the category number of the current frame. Then, for each macro-block, the decoded image is produced as follows.

The difference decoding unit 201 produces the difference image by decoding the difference encoded data. It also decodes the motion vector data. The reference image specifying data decoding unit 203 decodes the reference image specifying data. The reference image switching unit 208 sets the reference image to the image specified by the reference image specifying data. The reference image candidate is the image (first frame) stored in the memory (C1) for the first category of the reference image memory 205. The predicted image production unit 202 produces the predicted image corresponding to the motion vector from the reference image. The decoded image production unit 206 produces the decoded image from the difference image and the predicted image.

Such a processing is executed for all the macro-blocks. After decoding all the macro-blocks, the decoded image storing unit 207 stores the decoded image into the memory for the specified category number in the reference image memory 205 and outputs it. In the reference image memory 205 after decoding the fifth frame, the decoded images of the first frame and the fifth frame are stored in the memory (C1) for the first category.

For the third frame, the encoded data is decoded and the decoded image is obtained similarly as the fifth frame, and it is stored into the reference image memory 205 and outputted. The reference image candidates are the images (first frame, fifth frame) stored in the memory (C1) for the first category of the reference image memory 205.

In the reference image memory 205 after decoding the third frame, the decoded images of the first frame and the fifth frame are stored in the memory (C1) for the first category, and the decoded image of the third frame is stored in the memory (C2) for the second category.

For the second frame, the encoded data is decoded and the decoded image is obtained similarly as the fifth frame, and it is stored into the reference image memory 205 and outputted. The reference image candidates are the images (first frame, fifth frame, third frame) stored in the memory (C1) for the first category or the memory (C2) for the second category of the reference image memory 205.

In the reference image memory 205 after decoding the second frame, the decoded images of the first frame and the fifth frame are stored in the memory (C1) for the first category, the decoded image of the third frame is stored in the memory (C2) for the second category, and the decoded image of the second frame is stored in the memory (C3) for the third category.

For the fourth frame, the encoded data is decoded and the decoded image is obtained similarly as the fifth frame, and it is stored into the reference image memory 205 and outputted. The reference image candidates are the images (first frame, fifth frame, third frame, second frame) stored in the memory (C1 or C2 or C3) for the first category or the second category or the third category of the reference image memory 205.

In the reference image memory 205 after decoding the fourth frame, the decoded images of the first frame and the fifth frame are stored in the memory (C1) for the first category, the decoded image of the third frame is stored in the memory (C2) for the second category, and the decoded images of the second frame and the fourth frame are stored in the memory (C3) for the third category.

For the ninth frame, the encoded data is decoded and the decoded image is obtained similarly as the fifth frame, and it is stored into the reference image memory 205 and outputted. The reference image candidates are the images (first frame, fifth frame) stored in the memory (C1) for the first category of the reference image memory 205. At this point, only two frames can be stored into the memory (C1) for the first category so that the decoded image of the ninth frame is stored after discarding the image of the first frame which was stored in the oldest past.

In the reference image memory 205 after decoding the ninth frame, the decoded images of the fifth frame and the ninth frame are stored in the memory (C1) for the first category, the decoded image of the third frame is stored in the memory (C2) for the second category, and the decoded images of the second frame and the fourth frame are stored in the memory (C3) for the third category.

For the seventh frame, the encoded data is decoded and the decoded image is obtained similarly as the fifth frame, and it is stored into the reference image memory 205 and outputted. The reference image candidates are the images (fifth frame, ninth frame, third frame) stored in the memory (C1 or C2) for the first category or the second category of the reference image memory 205.

In the reference image memory 205 after decoding the seventh frame, the decoded images of the fifth frame and the ninth frame are stored in the memory (C1) for the first category, the decoded images of the third frame and the seventh frame are stored in the memory (C2) for the second category, and the decoded images of the second frame and the fourth frame are stored in the memory (C3) for the third category.

For the sixth frame, the encoded data is decoded and the decoded image is obtained similarly as the fifth frame, and it is stored into the reference image memory 205 and outputted. The reference image candidates are the images (fifth frame, ninth frame, third frame, seventh frame, second frame, fourth frame) stored in the memory (C1 or C2 or C3) for the first category or the second category or the third category of the reference image memory 205.

In the reference image memory 205 after decoding the sixth frame, the decoded images of the fifth frame and the ninth frame are stored in the memory (C1) for the first category, the decoded images of the third frame and the seventh frame are stored in the memory (C2) for the second category, and the decoded images of the second frame, the fourth frame and the sixth frame are stored in the memory (C3) for the third category.

For the eighth frame, the encoded data is decoded and the decoded image is obtained similarly as the fifth frame, and it is stored into the reference image memory 205 and outputted. The reference image candidates are the images (fifth frame, ninth frame, third frame, seventh frame, second frame, fourth frame, sixth frame) stored in the memory (C1 or C2 or C3) for the first category or the second category or the third category of the reference image memory 205.

At this point, only three frames can be stored into the memory (C3) for the third category so that the decoded image of the eighth frame is stored after discarding the image of the second frame which was stored in the oldest past. In the reference image memory 205 after decoding the eighth frame, the decoded images of the fifth frame and the ninth frame are stored in the memory (C1) for the first category, the decoded images of the third frame and the seventh frame are stored in the memory (C2) for the second category, and the decoded images of the fourth frame, the sixth frame and the eighth frame are stored in the memory (C3) for the third category. By the above, the decoding from the first frame to the ninth frame is carried out.

Figure 7:
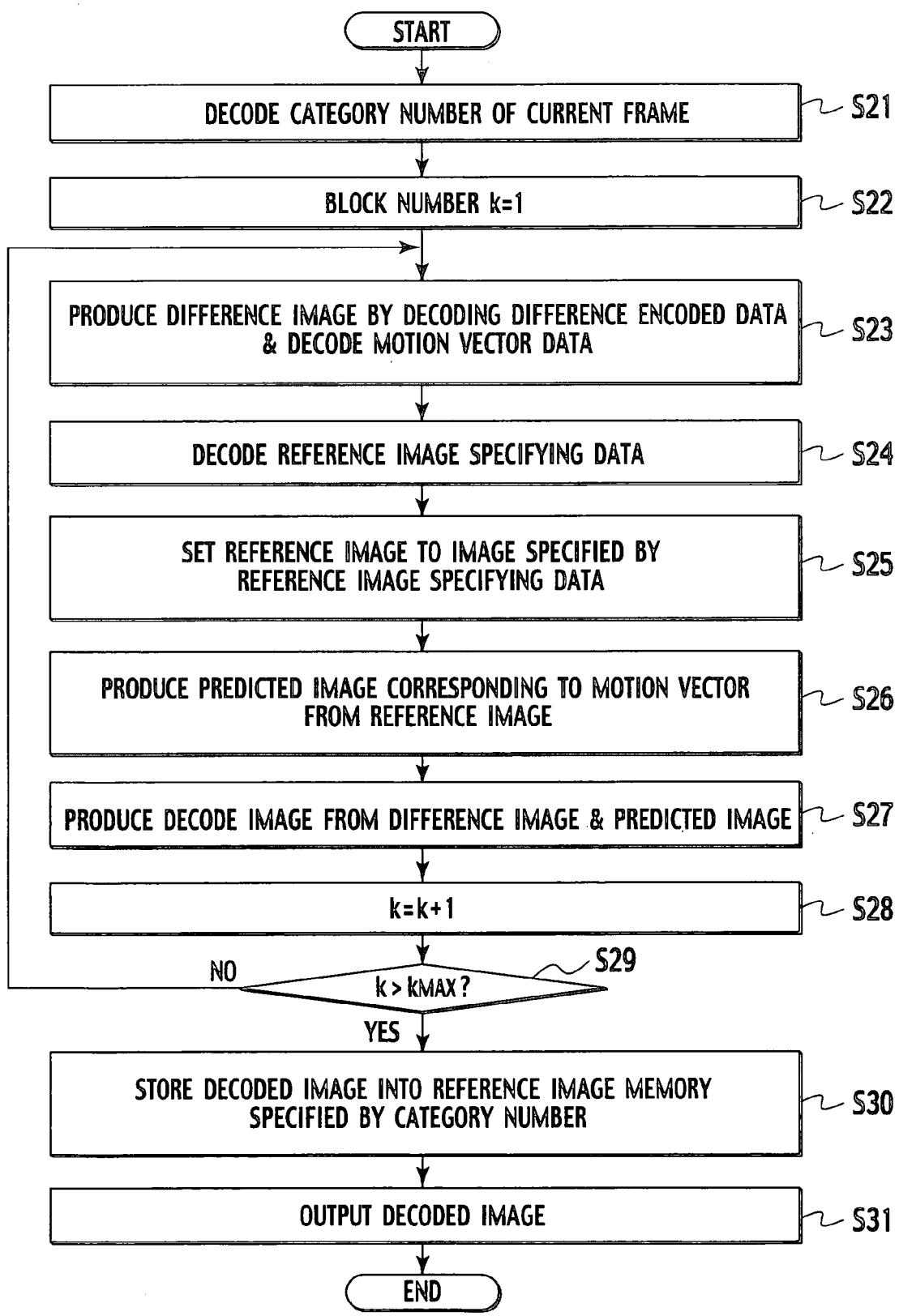
FIG. 7 is a figure showing one example of an image decoding processing flow.

FIG. 7 is a figure showing one example of the image decoding processing flow in the embodiment of the present invention. The flow of the processing after the first frame is already decoded and the decoded image is already stored in the reference image memory 205 will be described. First, the category number of the current frame is decoded (step S21). It is assumed that the block number k=1 (step S22).

The difference image is produced by decoding the difference encoded data, and also the motion vector data is decoded (step S23). The reference image specifying data is decoded (step S24), and the reference image is set to an image specified by the reference image specifying data (step S25). The predicted image corresponding to the motion vector is produced from the reference image (step S26).

Next, the decoded image is produced from the difference image and the predicted image (step S27), the block number k is incremented (step S28), and whether the decoded images are produced for all the macro-blocks (k>kMAX) or not is judged (step S29).

In the case where there is a macro-block for which the decoded image is not produced, it returns to the step S23, and in the case where the decoded images are produced for all the macro-blocks, the decoded image is stored into the reference image memory specified by the category number (step S30), the decoded image is outputted (step S31), and the processing is finished.

Next, the exemplary case of decoding by changing the time resolution in the embodiment of the present invention will be described. It is assumed that the first frame is already decoded and the decoded image is already stored in the reference image memory 205. In this example, it is assumed that only images of the first category (the fifth frame and the ninth frame of FIG. 1(C)) and the second category (the third frame and the seventh frame of FIG. 1(C)) among the encoded data are to be decoded.

For the fifth frame, the encoded data is decoded and the decoded image is obtained similarly as in the above described example, and it is stored into the reference image memory 205 and outputted. The reference image candidate is the image (first frame) stored in the memory (C1) for the first category of the reference image memory 205. In the reference image memory 205 after decoding the fifth frame, the decoded images of the first frame and the fifth frame are stored in the memory (C1) for the first category.

For the third frame, the encoded data is decoded and the decoded image is obtained similarly as the fifth frame, and it is stored into the reference image memory 205 and outputted. The reference image candidates are the images (first frame, fifth frame) stored in the memory (C1) for the first category of the reference image memory 205. In the reference image memory 205 after decoding the third frame, the decoded images of the first frame and the fifth frame are stored in the memory (C1) for the first category, and the decoded image of the third frame is stored in the memory (C2) for the second category.

For the ninth frame, the encoded data is decoded and the decoded image is obtained similarly as the fifth frame, and it is stored into the reference image memory 205 and outputted. The reference image candidates are the images (first frame, fifth frame) stored in the memory (C1) for the first category of the reference image memory 205. At this point, only two frames can be stored into the memory (C1) for the first category so that the decoded image of the ninth frame is stored after discarding the image of the first frame which was stored in the oldest past. In the reference image memory 205 after decoding the ninth frame, the decoded images of the fifth frame and the ninth frame are stored in the memory (C1) for the first category, and the decoded image of the third frame is stored in the memory (C2) for the second category.

For the seventh frame, the encoded data is decoded and the decoded image is obtained similarly as the fifth frame, and it is stored into the reference image memory 205 and outputted. The reference image candidates are the images (fifth frame, ninth frame, third frame) stored in the memory (C1 or C2) for the first category or the second category of the reference image memory 205.

In the reference image memory 205 after decoding the seventh frame, the decoded images of the fifth frame and the ninth frame are stored in the memory (C1) for the first category, and the decoded images of the third frame and the seventh frame are stored in the memory (C2) for the second category.

By the above, it is possible to correctly decode the images of the first category and the second category, without decoding the images of the third category. Similarly, it is also possible to decode only the images of the first category.

Figure 20:
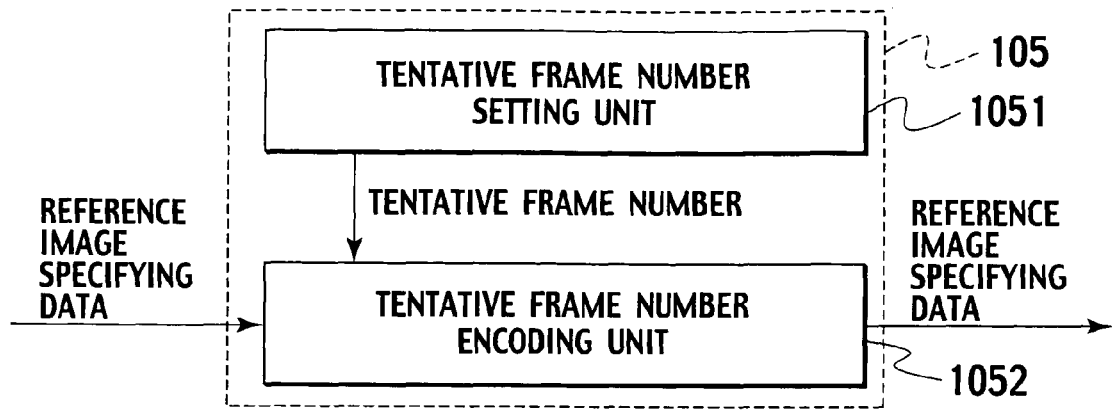
FIG. 20 is a figure showing one exemplary configuration of a reference image specifying data encoding unit.

The reference image specifying data encoding unit of the present embodiment encodes the reference image specifying data according to the method 1, and the reference image specifying data decoding unit decodes the reference image specifying data according to the method 1, but the reference image specifying data may be determined from the tentative frame number and encoded. A configuration of the reference image specifying data encoding unit 105 of the image encoding device in the case of using this method is shown in FIG. 20.

The reference image specifying data encoding unit 105 comprises a tentative frame number setting unit 1051 and a tentative frame number encoding unit 1052. Here, the tentative frame number setting unit 1051 sets the tentative frame numbers with respect to image data of frames belonging to the category of the current frame or below, among a plurality of image data stored in the reference image memory 107. The tentative frame number encoding unit 1052 encodes the tentative frame number that specifies the frame selected at the predicted image production unit 103 as the reference image specifying data.

Figure 21:
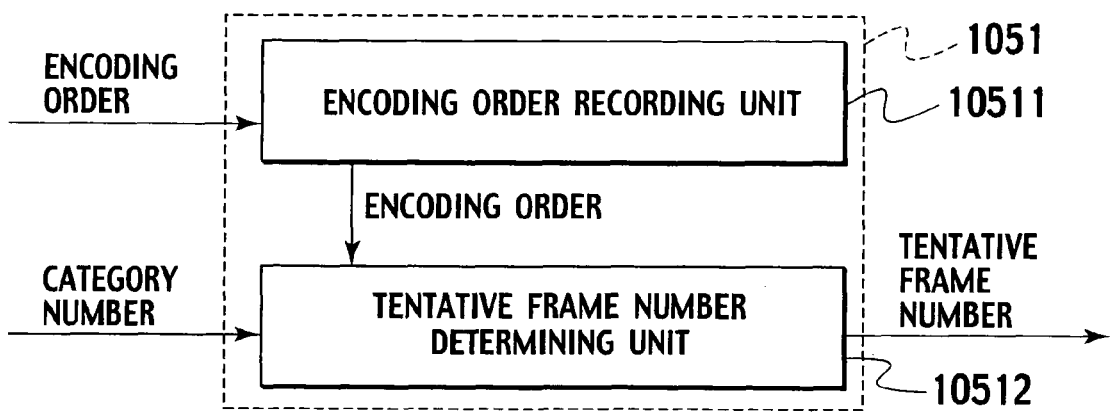
FIG. 21 is a figure showing one exemplary configuration of a tentative frame number setting unit.

As a method for setting the tentative frame number at the tentative frame number setting unit 1051, the method 1, the method 2 or the method 3 as described in the embodiment may be used. Else, as a method for utilizing the encoding order of each frame, there is a following example. The tentative frame number setting unit 1051 is formed by an encoding order recording unit 10511 and a tentative number determining unit 10512 as shown in FIG. 21. The encoding order recording unit 10511 records the encoding order of the frame encoded in the past as an encoding order number for each category. The tentative frame number determining unit 10512 determines the tentative frame number of the frame encoded in the past, from the encoding order number of the frame encoded in the past and the category number of the current frame.

Figure 22:
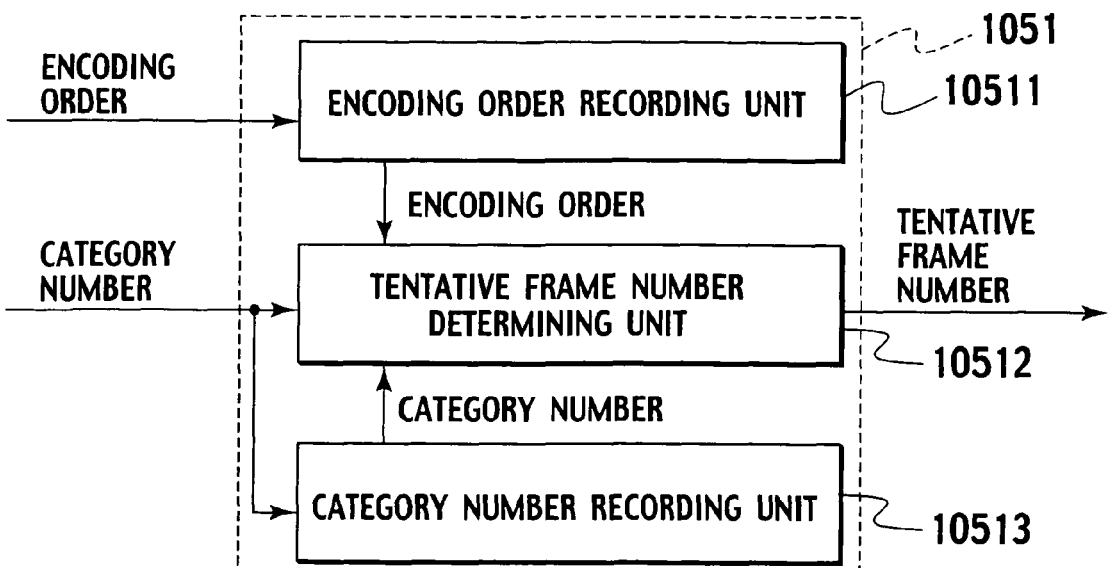
FIG. 22 is a figure showing another exemplary configuration of a tentative frame number setting unit.

Else, it is also possible for the tentative frame number setting unit 1051 to have a configuration shown in FIG. 22. In this case, the tentative frame number setting unit 1051 is formed by an encoding order recording unit 10511, a category number recording unit 10513, and a tentative frame number determining unit 10512. Here the encoding order recording unit 10511 records the encoding order the frame encoded in the past as an encoding order number, and the category number recording unit 10513 records the category number of the frame encoded in the past. Namely, the encoding order recording unit 10511 records the encoding order of each frame regardless of the category, rather than recording the encoding order for each category. Then, the tentative frame number determining unit 10512 determines the tentative frame number of the frame encoded in the past, from the encoding order number and the category number of the frame encoded in the past and the category number of the current frame.

Figure 23:
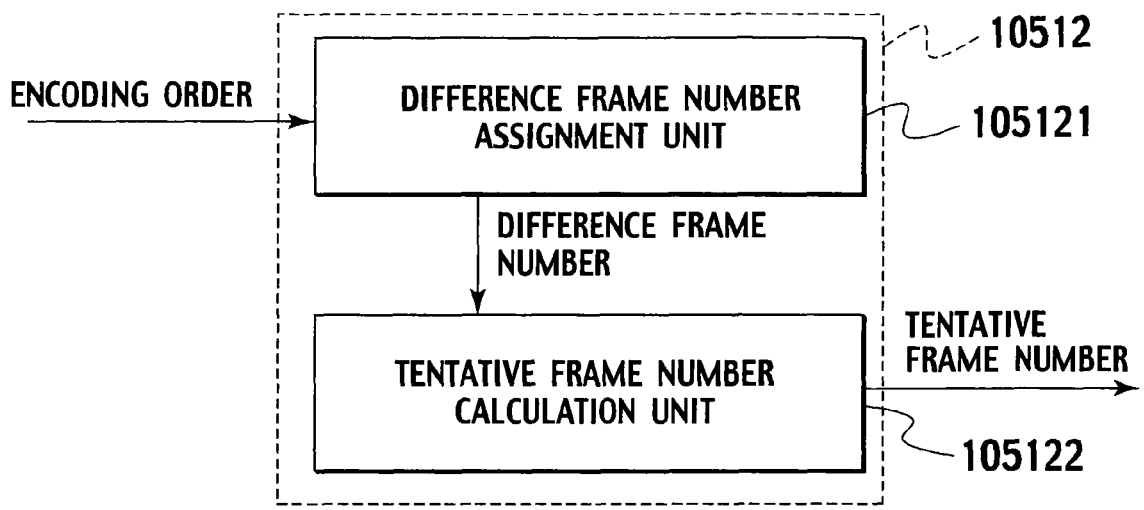
FIG. 23 is a figure showing one exemplary configuration of a tentative frame number determining unit.

Here, the tentative frame number determining unit 10512 may determine the tentative frame number from the encoding order as follows. The tentative frame number determining unit 10512 is formed by a difference frame number assignment unit 105121 and a tentative frame number calculation unit 105122 as shown in FIG. 23. The difference frame number assignment unit 105121 assigns a difference frame number from the encoding order number according to rules set in advance. Then, the tentative frame number calculation unit 105122 calculates the tentative frame number from a combination of the difference frame number and the category number of the current frame. At this point, a table for assigning the tentative frame number with respect to a combination of the difference frame number and the category number of the current frame may be provided in advance and the tentative frame number may be obtained by referring to the table from the difference frame number and the category number of the current frame. Else, a calculation formula for calculating the tentative frame number with respect to a combination of the difference frame number and the category number of the current frame may be set in advance and the tentative frame number may be calculated by the calculation from the difference frame number and the category number of the current frame.

Figure 24:
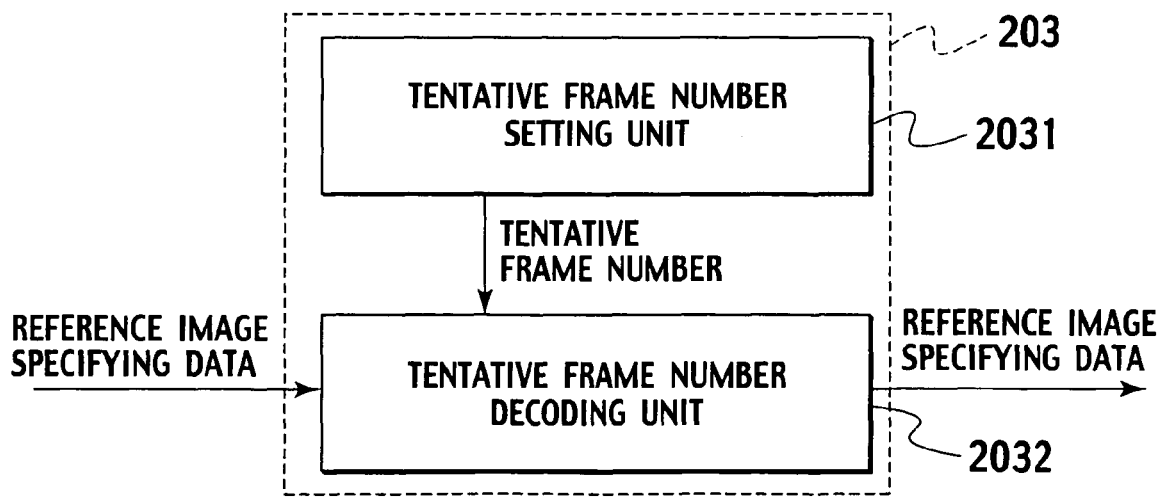
FIG. 24 is a figure showing one exemplary configuration of a reference image specifying data decoding unit.

Also, in these cases, it is possible to form the reference image specifying data decoding unit 203 from a tentative frame number setting unit 2031 and a tentative frame number decoding unit 2032 as shown in FIG. 24. Here, the tentative frame number setting unit 2031 sets the tentative frame numbers with respect to image data of frames belonging to the category of the current frame or below, among a plurality of image data stored in the reference image memory 205. The tentative frame number decoding unit 2032 decodes the tentative frame number that specifies the frame selected at the predicted image production unit 202 as the reference image specifying data.

In the present embodiment, the reference image specifying data is encoded according to the method 1 at the reference image specifying data encoding unit 105, and the reference image specifying data is decoded according to the method 1 at the reference image specifying data decoding unit 203. Namely, at the reference image specifying data encoding unit or the reference image specifying data decoding unit, the reference image specifying data is encoded or decoded by using a correspondence relationship of the reference image specifying data corresponding to each category which is set in advance. Next, a configuration for changing this correspondence relationship for each frame or slice will be shown.

Figure 8:
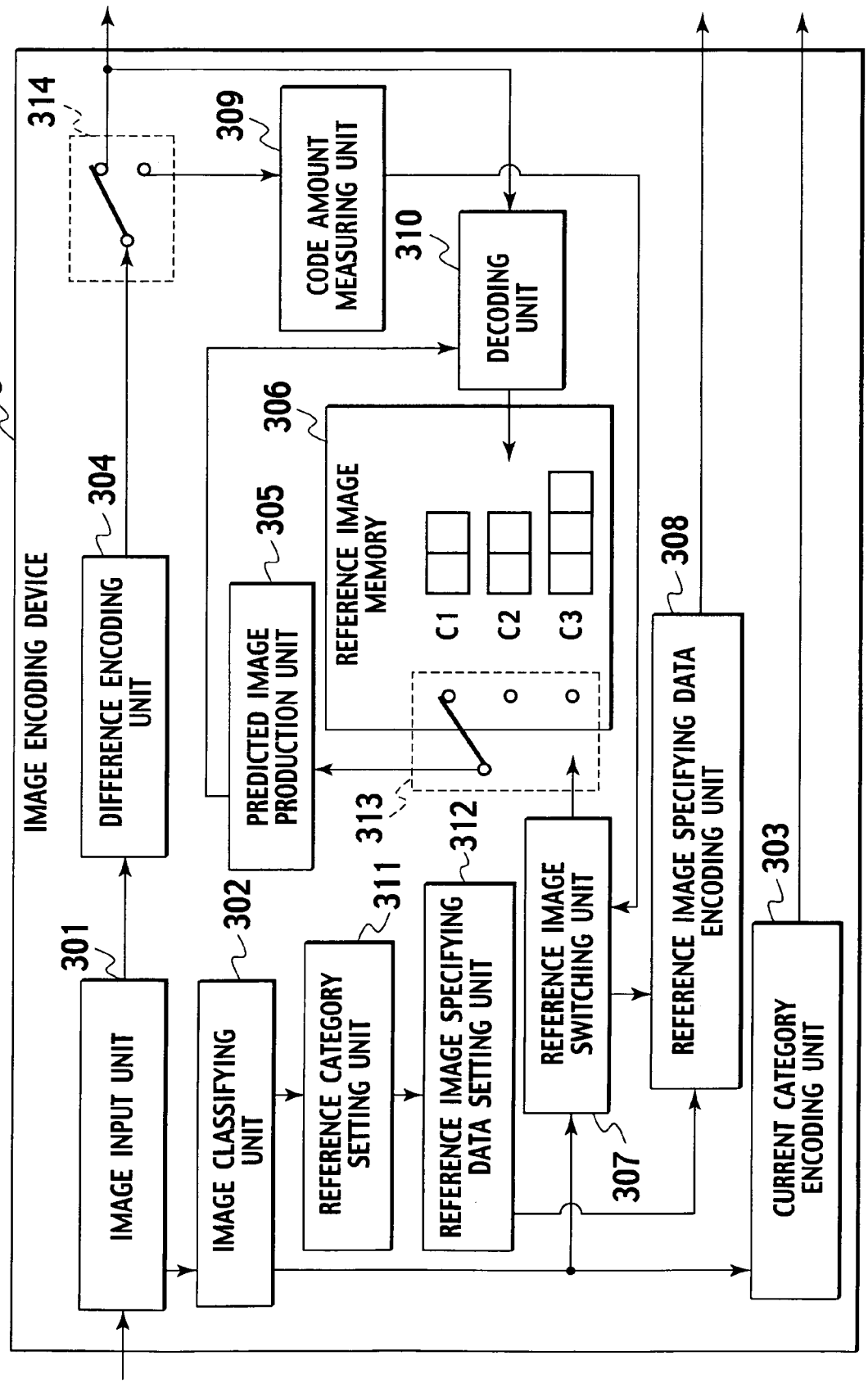
FIG. 8 is a figure showing a second exemplary configuration of an image encoding device.
Figure 9:
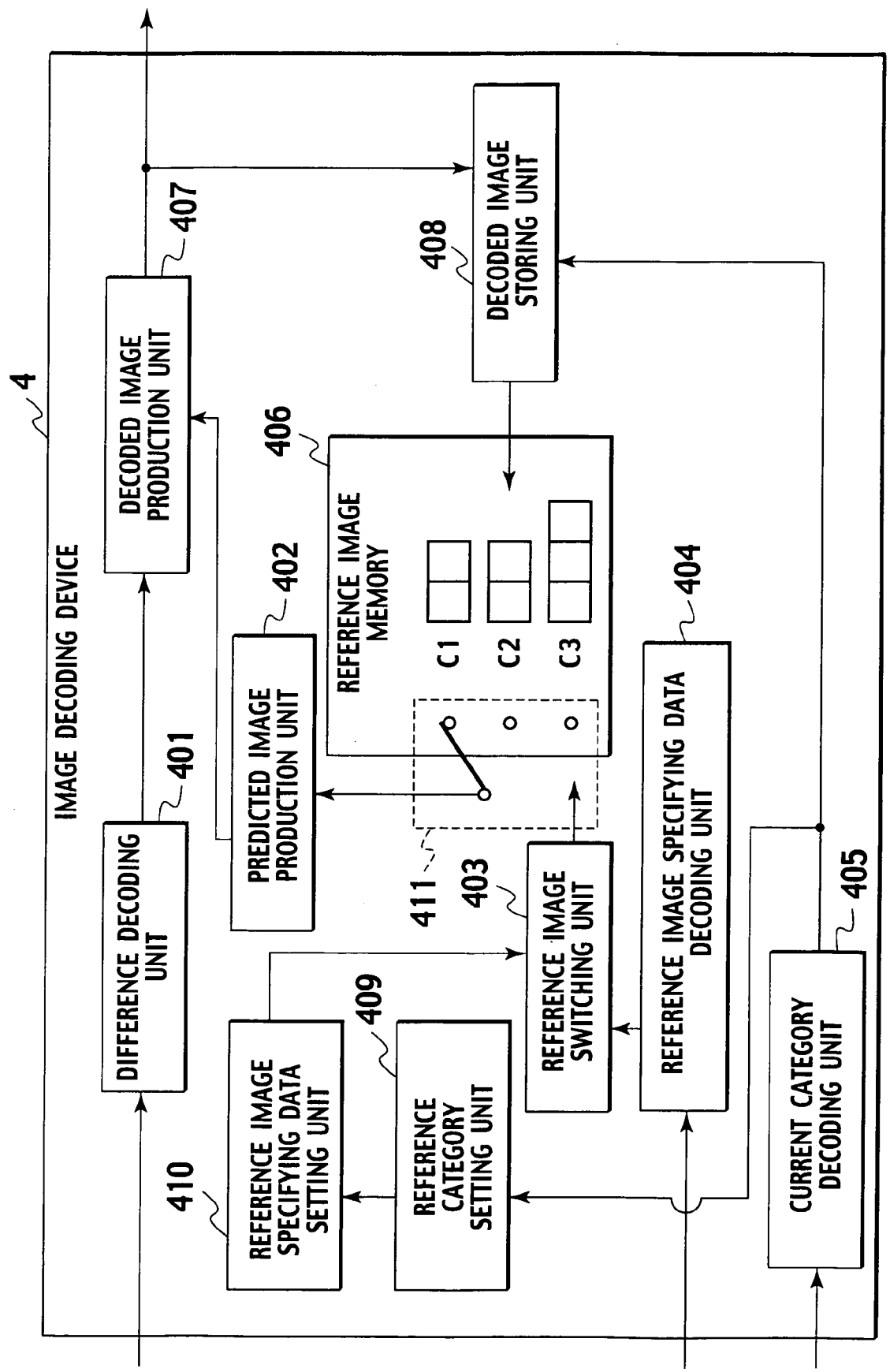
FIG. 9 is a figure showing a second exemplary configuration of an image decoding device.

A configuration of the image encoding device 3 in this case is shown in FIG. 8, and a configuration of the image decoding device 4 is shown in FIG. 9. These are configurations in which a reference category setting unit 311, 403 and a reference image specifying data setting unit 312, 410 are added respectively. In the image encoding device 3, the reference image specifying data encoding unit 308 encodes the reference image specifying data according to the correspondence relationship set at the reference image specifying data setting unit 312, with respect to the reference image set at the reference image switching unit 307. Also, in the image decoding device 4, the reference image specifying data decoding unit 404 decodes the reference image specifying data, and the reference image switching unit 403 switches the reference image according to the correspondence relationship set at the reference image specifying data setting unit 410.

The reference category setting unit 311, 403 in the image encoding device 3 and the image decoding device 4 sets the category number that can be referred, from the category number of the current frame for each frame. In the present embodiment, if the current frame is the first category, the first is set as the category that can be referred, and if the current frame is the second category, the first and the second are set as the category that can be referred, and if the current category is the third category, the first, the second and the third are set as the category that can be referred.

Note that it may be made not to include the category to which the current frame belongs in the category that can be referred, for those other than the first category, for example, instead of the setting shown in the present embodiment.

The reference image specifying data setting unit 312 in the image encoding device 3 selects either the method 1 or the method 2 with respect to the correspondence for each frame. At this point, data that specifies which method has been used is encoded. The reference image specifying data setting unit 410 in the image decoding device 4 decodes data that indicates which one of the method 1 and the method 2 has been selected with respect to the correspondence for each frame, and selects either one.

This setting of the correspondence may be executed for each slice rather than for each frame. Also, it may be made to set in advance a plurality of methods that can be selected without being limited to the method 1 or the method 2, and select any one of these. In addition, it may be made to encode the correspondence relationship itself, rather than setting methods that can be selected in advance. In the case of encoding the correspondence relationship, data that indicates the correspondence relationship of the reference image specifying data with respect to frames that belong to each category is encoded. At this point, it may be made to uniquely assign the frame number in advance as data for specifying the frame and utilize that. For example, in the case where the image data of the frame number 1 and the frame number 5 belonging to the first category are stored in the reference image memory, it may be made to set the reference image specifying data 1 in correspondence to the frame number 5 and set the reference image specifying data 2 in correspondence to the frame number 1.

In order to check the effect of the present invention, the experiment of the image encoding/decoding by the conventional method and the method of the present invention was conducted. In the method using the present invention, it has the reference image memory formed by three layers and the reference image memory has the first layer formed by image memories for two frames, the second layer formed by image memories for two frames, and the third layer formed by image memories for three frames, as described in the above described embodiment. This image encoding/decoding method using the method according to the present invention will be referred to as LayerMul hereafter.

As the convention method, a method in which the reference image memory is not managed for each layer, and only one frame is retained and the others are discarded among images stored in the reference image memory at a constant interval was used. This conventional method will be referred to as LayerOff hereafter.

For example, in the method LayerOff, the frame of the frame number (5) in FIG. 1 refers to the image of the frame number (1), the frame of the frame number (3) refers to the images of the frame number (1) and the frame number (5), the frame of the frame number (2) refers to the images of the frame number (1), the frame number (5) and the frame number (3), and the frame of the frame number (4) refers to the images of the frame number (1), the frame number (5), the frame number (3) and the frame number (2).

After encoding from the frame of the frame number (2) to the frame of the frame number (5) in this way, the images from the frame number (2) to the frame number (4) that are stored in the reference image memory are discarded and only the image of the frame number (5) is stored.

Then, the frame of the frame number (9) refers to the image of the frame number (5), the frame of the frame number (7) refers to the images of the frame number (5) and the frame number (9), the frame of the frame number (6) refers to the images of the frame number (5), the frame number (9) and the frame number (7), and the frame of the frame number (8) refers to the images of the frame number (5), the frame number (9), the frame number (7) and the frame number (6).

After encoding from the frame of the frame number (6) to the frame of the frame number (9) in this way, the images from the frame number (6) to the frame number (8) that are stored in the reference image memory are discarded and only the image of the frame number (9) is stored.

As in the above, one frame is retained and the others are discarded among images of the reference image memory for each four frames. The reference image specifying data that specifies the retained frame is reset to 1. According to this method, it is also possible to decode only the first layer, or decode only the first layer and the second layer, besides the method for decoding all layers.

Figure 10:
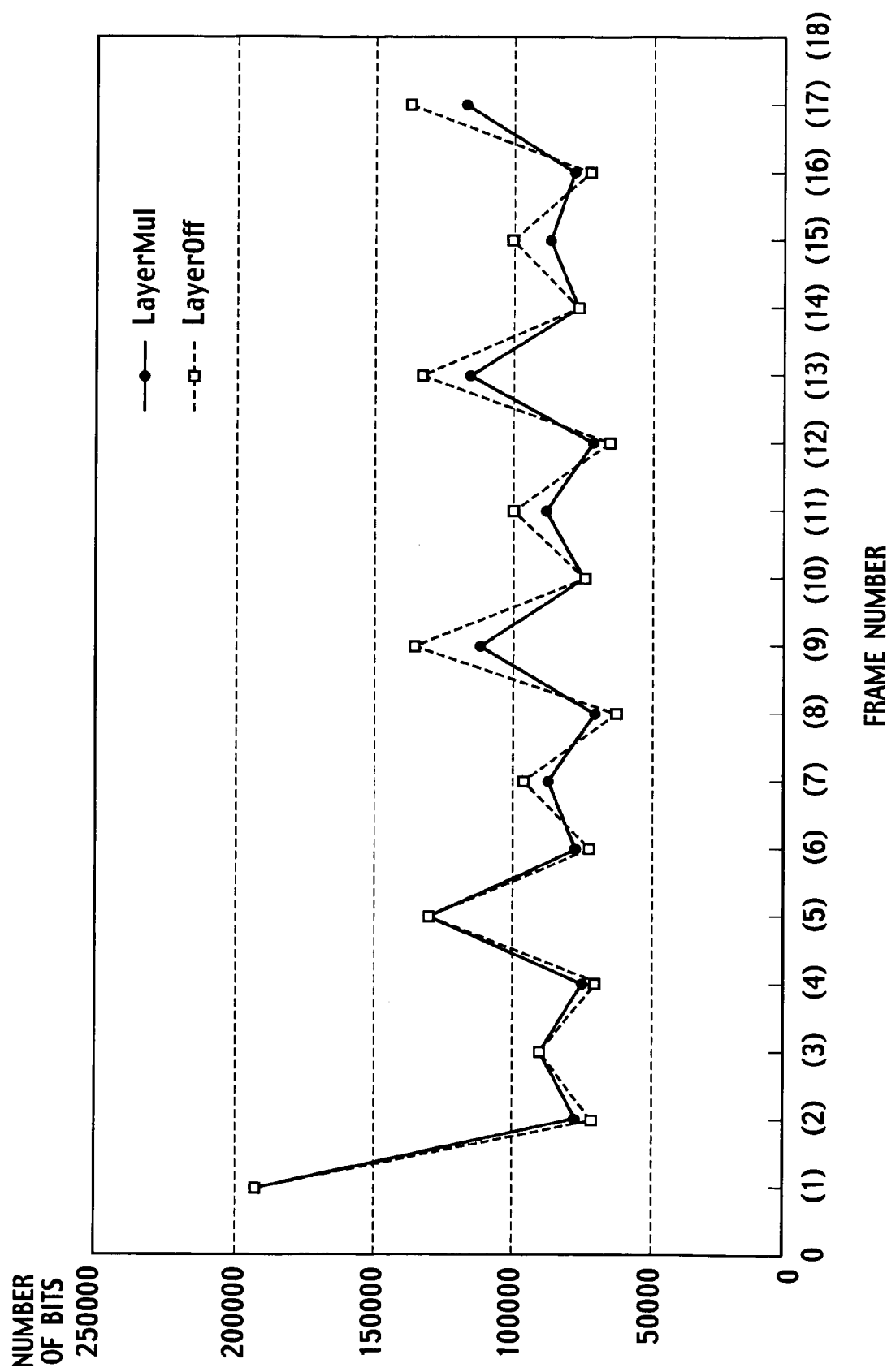
FIG. 10 is a figure for explaining effects of the present invention by comparison with the prior art.

The code amount (number of bits) per frame in the case of classifying the image A formed by 17 frames with the image size of 352 horizontal and 288 vertical pixels into three layers and encoding is shown in FIG. 10. A scheme adopted for the H.264 image encoding scheme was used for the predicted image production method and the encoding of the predicted difference.

The experiment is conducted by fixing the quantization scale, and it is nearly the same value for the method LayerMul and the method LayerOff at each frame. As such both of them have nearly the same code amount up to the frame number (6), but the code amount is less for the method LayerMul than the method LayerOff at the subsequent odd number frames.

This is due to the fact that the odd number frame belongs to the first layer and the second layer so that the number of frames that can be utilized as the reference image is greater for the method LayerMul. Namely, according to the present invention, by managing the reference image memory for each layer, it is shown that the coding efficiency of each layer is improved.

In the embodiment of the present invention described above, the predicted image is produced from the reference image of one frame, but the predicted image may be produced from a plurality of reference images. In this case, at the image encoding device 1, the reference image switching unit 110 selects a plurality of reference images, and the predicted image production unit 103 produces the predicted image from the plurality of reference images. Also, the reference image specifying data encoding unit 105 encodes a plurality of reference image specifying data.

At the image decoding device 2, the reference image switching unit 208 selects a plurality of reference images, and the predicted image production unit 202 produces the predicted image from the plurality of reference images. Also the reference image specifying data decoding unit 203 decodes a plurality of reference image specifying data.

In order to produce the predicted image from a plurality of reference images, the image data of the corresponding pixel positions may be averaged among the reference images. Also, the weighting may be carried out at a time of averaging. The weight may be calculated from the time interval from the current frame such that the weight becomes smaller for the older image, for example. Else, it may be encoded explicitly.

Also, the case where the allocation of the reference image memory with respect to each category is fixed has been described as the present embodiment, the present invention is not limited to the case where the allocation of the reference image memory is fixed, and the allocation of the memory may be changed at an intermediate frame. For example, after encoding/decoding the fourth frame, the memory (C1) for the first category may be set to be three frames and the memory (C3) for the third category may be set to be two frames. By increasing the memory amount of the category, it is possible to improve the coding efficiency of that category.

Figure 11:
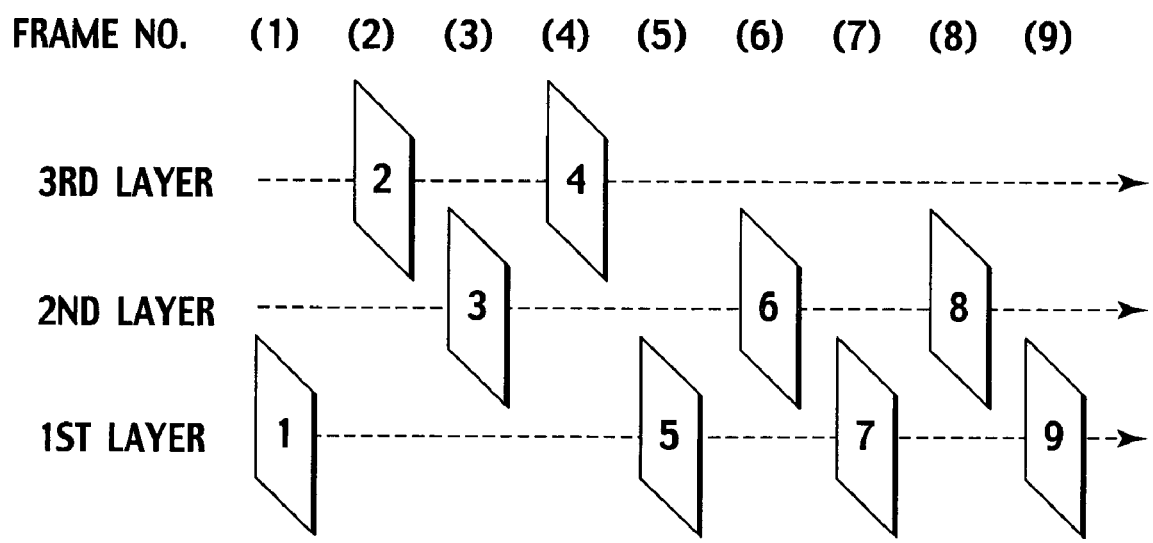
FIG. 11 is a figure showing an example of the prediction relationship of a layer configuration.

Also, the example in which frames are assigned to categories periodically has been described as the present embodiment, but the present invention is not limited to the case where frames are assigned to categories periodically. For example, as shown in FIG. 11, it may be made such that categories up to the third category are set until the fourth frame is encoded, and at a time of encoding the subsequent frames, categories up to the second category are encoded and the third category is not encoded. In this case, it is preferable to change the allocation of the reference image memory to categories.

Also, the example in which the category number of the current frame is encoded for each frame has been described as the present embodiment, but the present invention is not limited to the case where the category number of the current frame is encoded for each frame, and it may be encoded for a plurality of frames. For example, at the encoding side, it may be made such that the encoded data for frames belonging to the same category are stored instead of outputting the encoded data for each frame, and after encoding a number of frames of a certain extent, the category number is encoded for each category and the encoded data of frames belonging to the category specified by that number are outputted collectively. In this method, it is easier to take out the desired encoded data from the encoded data outputted at the encoding side, at a time of decoding the encoded data of a particular category at the decoding side, because the encoded data are put together for each category.

In the case where it is formed by separate encoded data for each category in this way, not only it is easier to take out the encoded data of the desired category at the decoding side, but it is also possible to take out the encoded data of a particular category at a relay device in the case where there is a relay device between the encoding side and the decoding side. By making it in this way, in the case where a plurality of frames constitute the video image, it is possible to make it such that they are decoded and outputted at a low frame rate ordinarily at the decoding side, and when it becomes the necessary time zone, the decoding side decodes and outputs them at a high frame rate only during that time zone as the decoding side requests and receives the encoded data of many categories to the relay device.

Also, the example where the reference image specifying data is encoded by the above described method 1 has been described as the present embodiment, but the present invention is not limited to the case where the reference image specifying data is encoded by the above described method 1, and it suffices to be a specifying method such that the image to be referred coincides in the case where the encoding side and the decoding side can specify the reference image uniquely and frames of the category that are not to be used as the reference image are not to be decoded.

Figure 12:
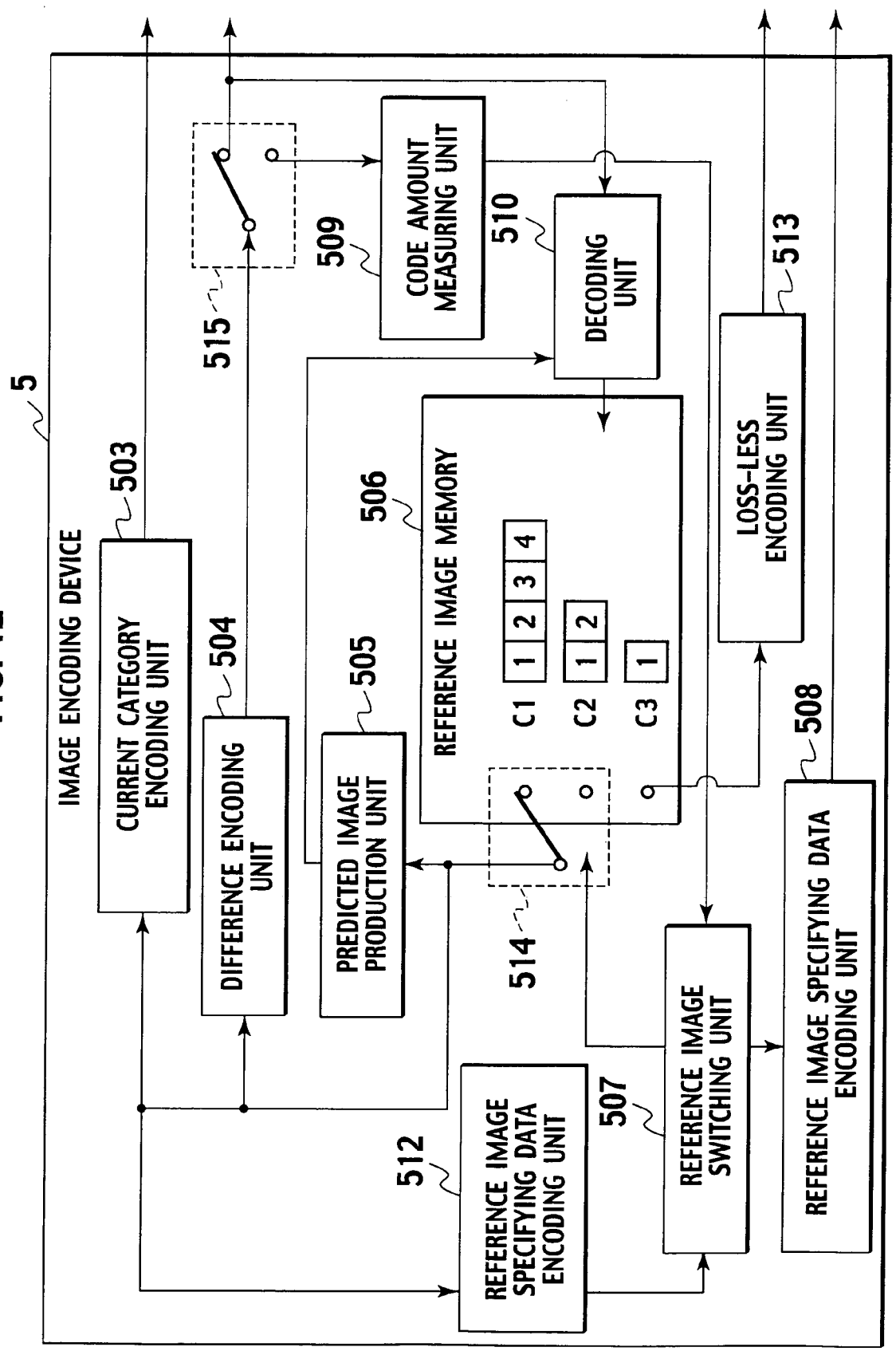
FIG. 12 is a figure showing a third exemplary configuration of an image encoding device.
Figure 13:
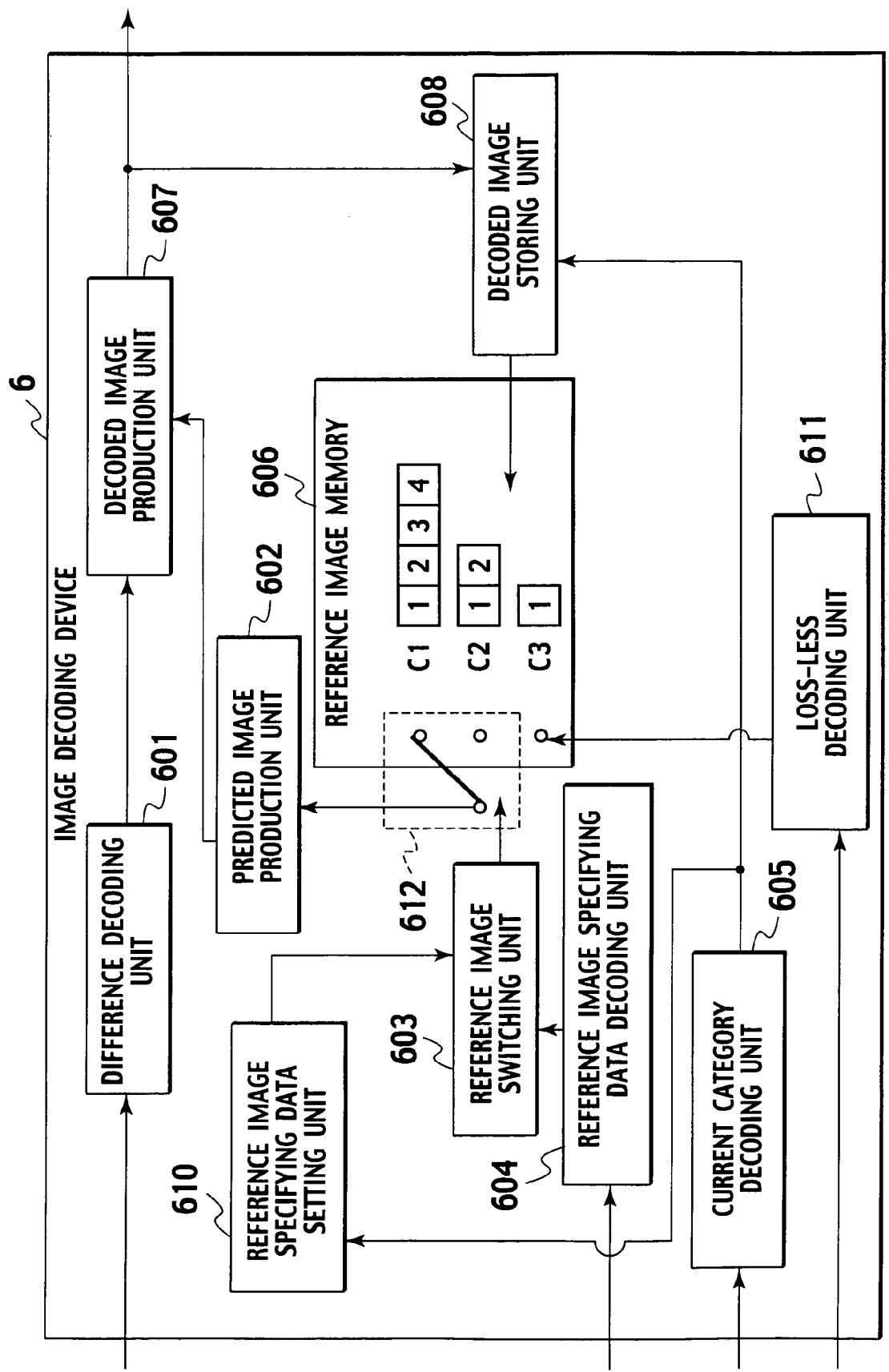
FIG. 13 is a figure showing a third exemplary configuration of an image decoding device.

Next, another embodiment of the image encoding device and the image decoding device of the present invention will be shown. A configuration of the image encoding device 5 in this case is shown in FIG. 12, and a configuration of the image decoding device 6 is shown in FIG. 13.

At the reference image specifying data setting unit 512 of the image encoding device 5, the frame number is uniquely assigned in advance as data for specifying the frame, and the correspondence relationship which sets the reference image specifying data in correspondence to it is encoded. It is assumed that the correspondence assigns the numbers for specifying the reference images in an order of smaller category numbers, or in an order of smaller frame numbers, for the frames which become the reference image candidates. At the reference image specifying data setting unit 610 of the image decoding device 6, this correspondence relationship is decoded. At the predicted image production unit 505 in the image encoding device 5, the current frame is divided into macro-blocks, the motion vector for each macro-block is searched, and the predicted image corresponding to the motion vector position is produced. The loss-less encoding unit 513 carries out the loss-less encoding of the image data.

Figure 14:
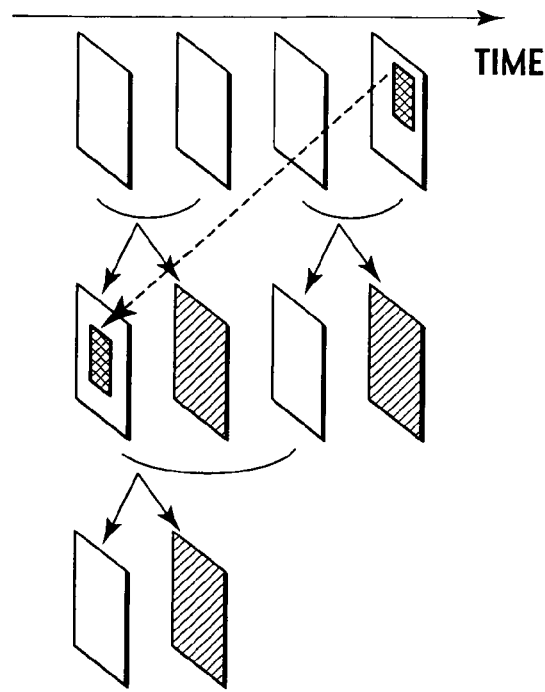
FIG. 14 is a figure showing an example of the MCTF image encoding.

Here, the processing in the case of encoding the input images of four frames shown in FIG. 14 will be shown. It is assumed that the reference image memory has memories of one frame for the third category, two frames for the second category, and four frames for the first category. Then, it is assumed that the original image to be inputted is stored in the memory for the first category within the reference image memory.

First, the encoding of the frame 1 and the frame 2 in the memory for the first category is carried out. The current category encoding unit 503 encodes the category number 1.

The reference image specifying data setting unit 512 sets the correspondence of the reference image specifying data with respect to the reference image in the case where the current frame is the frame 1. At this point, only the frame 2 of the first category is set as the reference image. The predicted image production unit 505 produces the predicted image from the frame 2. The difference encoding unit 504 encodes the higher band image data which is a difference between the predicted image and the image of the current frame and also encodes the motion vector to be used at a time of producing the predicted image. The decoding unit 510 produces the lower band image data from the higher band image data and the predicted image data, and stores the lower band image data into the frame 1 of the reference image memory 506 for the second category. The reference image specifying data encoding unit 508 encodes the reference image specifying data.

Next, the encoding of the frame 3 and the frame 4 in the memory for the first category is carried out. The current category encoding unit 503 encodes the category number 1. The reference image specifying data setting unit 512 sets the correspondence of the reference image specifying data with respect to the reference image in the case where the current frame is the frame 3. At this point, the frame 1, the frame 2 and the frame 4 of the first category and the frame 1 of the second category are set as the reference images. Next, for each macro-block, one of the set reference images is selected, and the following processing is carried out. The predicted image production unit 505 produces the predicted image from the selected reference image, and the difference encoding unit 504 encodes the higher band image data which is a difference between the predicted image and the image of the current frame and also encodes the motion vector to be used at a time of producing the predicted image, and the code amount measuring unit 509 measures the code amount at that time.

This processing is carried out for all the reference images, and the code amount measuring unit 509 commands the reference image switching unit 507 to select one with the smaller code amount as the reference image. The reference image switching unit 507 selects the commanded reference image, and the predicted image production unit 505 produces the predicted image, and the difference image encoding unit 504 encodes the higher band image data which is a difference between the predicted image and the image of the current frame and also encodes the motion vector to be used at a time of producing the predicted image. The reference image specifying data encoding unit 508 encodes the reference image specifying data. After carrying out the above described processing for all the macro-blocks, the decoding unit 510 produces the lower band image data from the higher band image data and the predicted image data, and stores the lower band image data into the frame 2 of the reference image memory 506 for the second category. Here, in the case where the selected reference image is other than the frame 4 of the first category, the higher band image data of that macro-block will not be used.

Next, the encoding of the frame 1 and the frame 2 in the memory for the second category is carried out. The current category encoding unit 503 encodes the category number 2. The reference image specifying data setting unit 512 sets the correspondence of the reference image specifying data with respect to the reference image in the case where the current frame is the frame 1. At this point, the frame 2 of the second category is set as the reference image.

Next, for each macro-block, one of the set reference images is selected, and the following processing is carried out. The predicted image production unit 505 produces the predicted image from the selected reference image, and the difference encoding unit 504 encodes the higher band image data which is a difference between the predicted image and the image of the current frame and also encodes the motion vector to be used at a time of producing the predicted image, and the code amount measuring unit 509 measures the code amount at that time.

This processing is carried out for all the reference images, and the code amount measuring unit 509 commands the reference image switching unit 507 to select one with the smaller code amount as the reference image. The reference image switching unit 507 selects the commanded reference image, and the predicted image production unit 505 produces the predicted image, and the difference image encoding unit 504 encodes the higher band image data which is a difference between the predicted image and the image of the current frame and also encodes the motion vector to be used at a time of producing the predicted image. The reference image specifying data encoding unit 508 encodes the reference image specifying data.

After carrying out the above described processing for all the macro-blocks, the decoding unit 510 produces the lower band image data from the higher band image data and the predicted image data, and stores the lower band image data into the frame 1 of the reference image memory 506 for the third category. Then finally the loss-less encoding unit 513 carries out the loss-less encoding of the image data stored in the frame 1 of the reference image memory for the third category.

Figure 15:
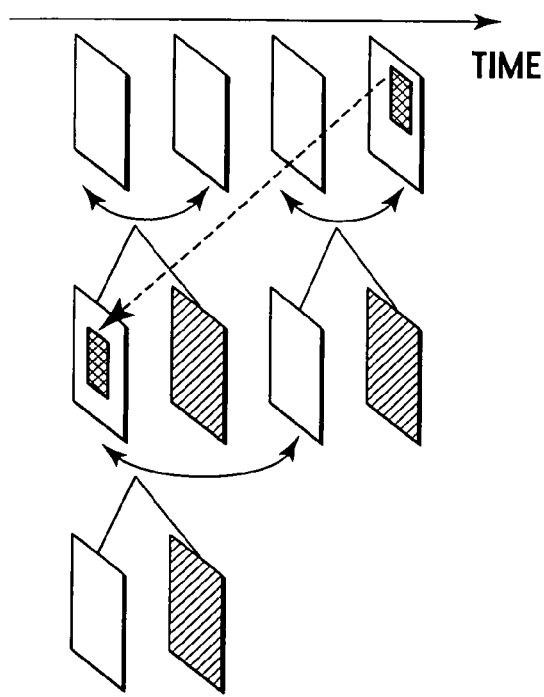
FIG. 15 is a figure showing an example of the MCTF image decoding.
Figure 18:
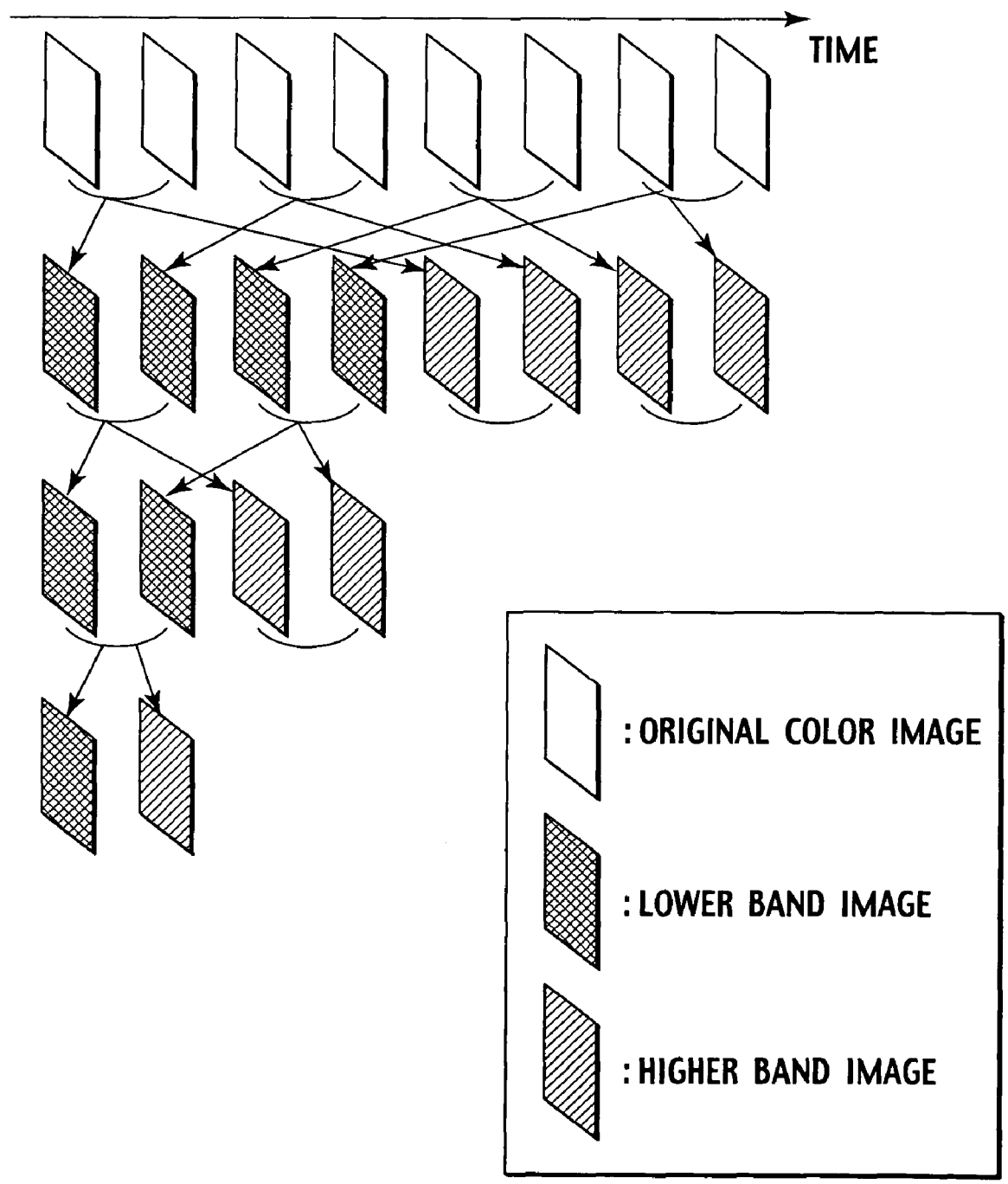
FIG. 18 is a figure showing an example of a filter in time direction in the MCTF encoding.
Figure 19:
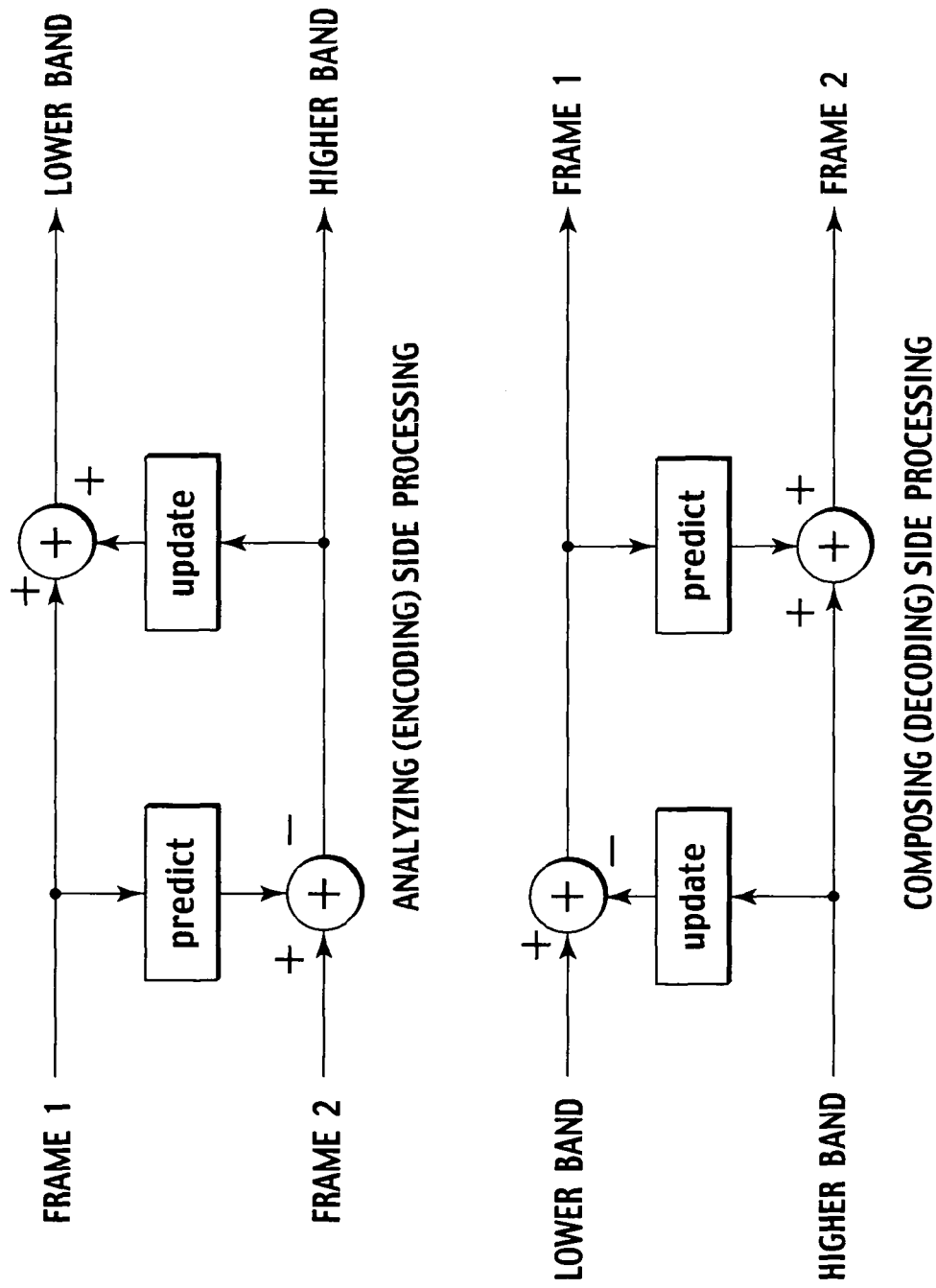
FIG. 19 is a figure showing an example of the Lifting Scheme at the Haar basis.

Next, the procedure in the case of decoding the encoded data produced in this way into the output images of four frames shown in FIG. 15 will be shown. They are decoded in an order of the third category, the second category, and the first category.

First, the current category decoding unit 605 decodes the category number 3. The loss-less decoding unit 611 decodes the encoded data and stores the decoded image into the frame 1 of the third category.

Next, the decoding of the second category is carried out. The current category decoding unit 605 decodes the category number 2. The reference image specifying data setting unit 604 sets the correspondence of the reference image specifying data with respect to the reference image in the case where the current frame is the frame 1. The reference image specifying data for specifying the frame 2 of the second category which is set as the reference image at the image encoding device 5 is set in correspondence such that it specifies the frame 1 of the third category. At this point, the frame 1 of the third category is set as the reference image.

Next, for each macro-block, the following processing is carried out. The difference decoding unit 601 decodes the higher band image data and the motion vector. The reference image specifying data decoding unit 604 decodes the reference image specifying data. The reference image switching unit 603 selects the reference image specified by the reference image specifying data, and the predicted image production unit 602 produces the predicted image by using the motion vector. The decoded image production unit 607 produces the two frames of the decoded images from the higher band image data and the predicted image. The decoded image storing unit 608 stores the decoded images into the frame 1 and the frame 2 of the second category.

Then, the decoding of the first category is carried out. First, the procedure for decoding the frame 1 and the frame 2 will be shown. The current category decoding unit 605 decodes the category number 1. The reference image specifying data setting unit 610 sets the correspondence of the reference image specifying data with respect to the reference image in the case where the current frame is the frame 1. The reference image specifying data for specifying the frame 2 of the first category which is set as the reference image at the image encoding device 5 is set in correspondence such that it specifies the frame 1 of the second category. At this point, the frame 1 of the second category is set as the reference image.

Next, for each macro-block, the following processing is carried out. The difference decoding unit 601 decodes the higher band image data and the motion vector. The reference image specifying data decoding unit 604 decodes the reference image specifying data. The reference image switching unit 603 selects the reference image specified by the reference image specifying data, and the predicted image production unit 602 produces the predicted image by using the motion vector. The decoded image production unit 607 produces the two frames of the decoded images from the higher band image data and the predicted image. The decoded image storing unit 608 stores the decoded images into the frame 1 and the frame 2 of the first category.

Next, the procedure for decoding the frame 3 and the frame 4 will be shown. The current category decoding unit 605 decodes the category number 1. The reference image specifying data setting unit 610 sets the correspondence of the reference image specifying data with respect to the reference image in the case where the current frame is the frame 3. The reference image specifying data for specifying the frame 4 of the first category which is set as the reference image at the image encoding device 5 is set in correspondence such that it specifies the frame 2 of the second category. At this point, the frame 1 and the frame 2 of the second category and the frame 1 and the frame 2 o the first category are set as the reference images.

Next, for each macro-block, the following processing is carried out. The difference decoding unit 601 decodes the higher band image data and the motion vector. The reference image specifying data decoding unit 604 decodes the reference image specifying data. The reference image switching unit 603 selects the reference image specified by the reference image specifying data, and the predicted image production unit 602 produces the predicted image by using the motion vector. The decoded image production unit 607 produces the two frames of the decoded images from the higher band image data and the predicted image. Here, in the case where the selected reference image is other than the frame 2 of the second category, the higher band image data of that macro-block will not be used.

The decoded image storing unit 608 stores the decoded images into the frame 3 and the frame 4 of the first category. By the above, the four frames of the first category which are the encoding target images are decoded. Here, the motion search is carried out at the predicted image production unit 602, but without carrying out this, the predicted image may be produced from the image data of the same position within the screen.

According to the present embodiment, the reference image can be selected from a plurality of reference images at a time of encoding the frame 3 and the frame 4 of the second category, so that it is possible to improve the coding efficiency.

Also, the example in which a plurality of images are encoded by allocating them to frames and regarding them as the video image has been described as the present embodiment, but the present invention is not limited to the case where a plurality of images are encoded by allocating them to frames and regarding them as the video image, and there may be no correlation on time in the plurality of images. Namely, for a plurality of images taken by changing the viewpoints or views, each image may be encoded by regarding it as a frame.

Also, the example in which the predicted difference is encoded irreversibly has been described as the present embodiment, but the present invention is not limited to the case where the predicted difference is encoded irreversibly, and it may be encoded reversibly. In this case, it may be made such that the decoding unit 108 is not provided at the image encoding device 1, and the original image is stored into the reference image memory 107 instead of storing the decoded images.

Also, the present invention is not limited to the case of encoding the two dimensional images, and the dimension of the image may be other than two dimension. For example, a plurality of images of three dimensions may be encoded, and a plurality of images of one dimension may be stored.

POSSIBILITY OF UTILIZATION IN INDUSTRY

According to the present invention, at a time of encoding or decoding the image of a plurality of frames, by classifying the reference image memory into a plurality of categories, and managing the reference images for each category, the identical reference image is specified in the case of decoding the category and the case of not decoding, so that the correct decoded image can be obtained. Also, the number of reference images for each category can be made larger so that the coding efficiency can be improved.

The invention claimed is:

1. An image decoding method for decoding image data formed by a plurality of frames, executed by an image decoding device having a reference image memory for storing the plurality of frames which are classified into a plurality of categories, the image decoding method characterized by having
    a current category decoding step for decoding a category number of a current frame,
    a reference image specifying data decoding step for decoding a reference image specifying data which specifies a reference image data, for said decoded category number,
    a predicted image producing step for producing a predicted image from an image data specified by said reference image specifying data,
    a difference decoding step for decoding a difference between a decoded image of the current frame and the predicted image,
    a decoded image producing step for producing the decoded image of the current frame from said decoded difference data and said predicted image, and
    a decoded image storing step for storing said produced decoded image data of the current frame into said reference image memory for said decoded category number,
    wherein said reference image specifying data decoding step has
    a tentative frame number setting step for setting a tentative frame number with respect to the image data of a frame belonging to an i-th category, among a plurality of image data stored in said reference image memory, and
    a tentative frame number decoding step for obtaining the tentative frame number which specifies an image data to be selected at said predicted image producing step, by decoding the reference image specifying data.

2. The image decoding method as described in claim 1, characterized in that
    said reference image specifying data is formed by a category number to which the reference image data to be read from said reference image memory by said predicted image producing step belongs and a frame number for specifying a frame belonging to a category specified by that number.

3. The image decoding method as described in claim 1, characterized in that said tentative frame number setting step has
   a decoding order recording step for recording a decoding order of a frame decoded in past as a decoding order number for each category, and
   a tentative frame number determining step for determining the tentative frame number of the frame decoded in past, from the decoding order number of the frame decoded in past and the category number of the current frame.

4. The image decoding method as described in claim 1, characterized in that said tentative frame number setting step has
   a decoding order recording step for recording a decoding order of a frame decoded in past as a decoding order number,
   a category number recording step for recording the category number of the frame decoded in past, and
   a tentative frame number determining step for determining the tentative frame number of the frame decoded in past, from the decoding order number of the frame decoded in past and the category number of the current frame.

5. The image decoding method as described in claim 3 or 4, characterized in that said tentative frame number determining step has
   a difference frame number assigning step for assigning a difference frame number in an order of larger decoding order number, and
   a tentative frame number calculating step for being equipped in advance with a table for assigning the tentative frame number with respect to a combination of the difference frame number and the category number of the current frame, and calculating the tentative frame number by referring to the table from the difference frame number and the current frame number.

6. The image decoding method as described in claim 3 or 4, characterized in that said tentative frame number determining step has
   a difference frame number assigning step for assigning a difference frame number in an order of larger decoding order number, and
   a tentative frame number calculating step for setting in advance a calculation formula for calculating the tentative frame number with respect to a combination of the difference frame number and the category number of the current frame, and calculating the tentative frame number from the difference frame number and the current frame number by calculation.

7. An image decoding device for decoding image data formed by a plurality of frames, the image decoding device characterized by comprising
   a reference image memory for a plurality of frames which are classified into N sets (N≧2) of categories,
   a current category decoding unit for decoding a category number of a current frame,
   a reference image specifying data decoding unit for decoding a reference image specifying data which specifies a reference image data, for the category number obtained by said current category decoding unit,
   a predicted image producing unit for producing a predicted image from an image data specified by said reference image specifying data,
   a difference decoding unit for decoding a difference between a decoded image of the current frame and the predicted image,
   a decoded image producing unit for producing the decoded image of the current frame from said decoded difference data and said predicted image, and
   a decoded image storing unit for storing said produced decoded image data of the current frame into the reference image memory for the category number obtained by said current category decoding unit,
   wherein said reference image specifying data decoding unit has
   a tentative frame number setting unit for setting a tentative frame number with respect to the image data of a frame belonging to an i-th category, among a plurality of image data stored in said reference image memory, and
   a tentative frame number decoding unit for obtaining the tentative frame number which specifies an image data to be selected at said predicted image producing unit, by decoding the reference image specifying data.

8. An image decoding method for decoding image data formed by a plurality of frames, executed by an image decoding device having a reference image memory for storing the plurality of frames which are classified into a plurality of categories, the image decoding method characterized by having
   a current category decoding step for decoding a category number of a current frame,
   a reference category setting step for setting a category that can be referred at a time of decoding a frame of a category to which the current frame belongs,
   a reference image specifying data setting step for setting a reference image specifying data, for an image data of a frame stored in said reference image memory, which belongs to the category that can be referred that is set by said reference category setting step,
   a reference image specifying data decoding step for decoding the reference image specifying data which specifies a reference image data,
   a predicted image producing step for producing a predicted image from an image data specified by the reference image specifying data,
   a difference decoding step for decoding a difference between a decoded image of the current frame and the predicted image,
   a decoded image producing step for producing the decoded image from a difference data and the predicted image, and
   a decoded image storing step for storing the decoded image of the current frame into the reference image memory for the category number obtained by said current category decoding step,
   wherein said reference image specifying data decoding step has
   a tentative frame number setting step for setting a tentative frame number with respect to the image data of a frame belonging to an i-th category, among a plurality of image data stored in said reference image memory, and
   a tentative frame number decoding step for obtaining the tentative frame number which specifies an image data to be selected at said predicted image producing step, by decoding the reference image specifying data.

9. An image decoding device for decoding image data formed by a plurality of frames, the image decoding device characterized by comprising
   a reference image memory for a plurality of frames which are classified into N sets (N≧2) of categories, a current category decoding unit for decoding a category number of a current frame, a reference category setting unit for setting a category that can be referred at a time of decoding a frame of a category to which the current frame belongs, a reference image specifying data setting unit for setting a reference image specifying data, for an image data of a frame stored in said reference image memory, which belongs to the category that can be referred that is set by said reference category setting unit, a reference image specifying data decoding unit for decoding the reference image specifying data which specifies a reference image data, a predicted image producing unit for producing a predicted image from an image data specified by the reference image specifying data, a difference decoding unit for decoding a difference between a decoded image of the current frame and the predicted image, a decoded image producing unit for producing the decoded image from a difference data and the predicted image, and +a decoded image storing unit for storing the decoded image of the current frame into the reference image memory for the category number obtained by said current category decoding unit, wherein said reference image specifying data decoding unit has a tentative frame number setting unit for setting a tentative frame number with respect to the image data of a frame belonging to an i-th category, among a plurality of image data stored in said reference image memory, and a tentative frame number decoding unit for obtaining the tentative frame number which specifies an image data to be selected at said predicted image producing unit, by decoding the reference image specifying data.

10. A computer-readable recording medium storing a computer-executable image decoding program for causing a computer to execute the image decoding method as described in claim 1 or 8.

* * * * *